United States Patent [19]

Arens

[11] 3,810,082
[45] May 7, 1974

[54] CIRCUIT ARRANGEMENT FOR FORMING A TIME SEQUENCE OF SIGNALS

[75] Inventor: Egidius Arens, Achim, Germany

[73] Assignee: Fried Krupp Gesellschaft beschrankter Haftung, Essen, Germany

[22] Filed: June 30, 1972

[21] Appl. No.: 268,104

[30] Foreign Application Priority Data

July 23, 1971 Germany............................ 2136780
Dec. 18, 1971 Germany............................ 2163053

[52] U.S. Cl. ............ 340/6 R, 340/16 R, 343/113 R
[51] Int. Cl. ............................................. G01s 3/80
[58] Field of Search........ 340/6 R, 16 R; 343/113 R

[56] References Cited
UNITED STATES PATENTS

| | | | |
|---|---|---|---|
| 3,370,267 | 2/1968 | Barry | 340/6 R |
| 3,449,711 | 6/1969 | Ricketts, Jr. et al. | 340/6 R |
| 3,579,180 | 5/1971 | Taddeo | 343/113 R |

Primary Examiner—Richard A. Farley
Attorney, Agent, or Firm—Spencer & Kaye

[57] ABSTRACT

A circuit arrangement for forming a time sequence of group signals in the ranging art, particularly in the sonar art, and preferably for a receiving system for signals impinging in a planar wave front, for a momentarily effective characteristic of a group of adjacent, possibly overlapping group characteristics obtained from received signals originating from a number of adjacent transducers from a larger plurality of transducers, in the receiving system. The group signals are formed by varied, quantized time delays determined by the geometrical arrangement of the transducers and by the propagation speed of the impinging signals in the transmission medium. The circuit arrangement employs a single memory circuit having arrangements for the reading in and for the directed reading out of received signals, and a subsequently connected adding circuit of whose output the group signals of the group characteristics appear. An input circuit is provided for the repeated, consecutive interrogation of the respective momentary received signal from each individual transducer of a plurality $m$ of the adjacently positioned transducers. The input circuit is operative for reading the received signals, via a read-in point, in succession and in the same sequence into the memory circuit within which each read-in received signal consecutively occupies in steps memory locations which are further removed from the read-in point. The memory circuit is provided with a number of memory locations which at least and preferably are determined by the maximum time delay for the first interrogated received signal. An output circuit is provided for the destruction-free read-out of the stored received signals from a number of $n$ memory locations which correspond to the required time delays with respect to the read-in point. The adding circuit is connected to the output circuit and the group signals derived from the received signals appear in succession at the output of the adding circuit.

24 Claims, 19 Drawing Figures

CIRCUIT ARRANGEMENT FOR FORMING A TIME SEQUENCE OF SIGNALS

BACKGROUND OF THE INVENTION

This invention relates to a circuit arrangement for forming a time sequence of group signals. The present invention relates, more particularly, to a circuit arrangement for forming a time sequence of group signals in the ranging art, particularly in the sonar art, and preferably in a receiving system for signals impinging in a planar wavefront.

The present invention involves a circuit arrangement for determining a momentarily effective characteristic of a group of adjacent, possibly overlapping characteristics obtained from received signals originating from a number of adjacent transducers from a larger plurality of transducers in the receiving system, the group signals being formed by varied quantized time delays determined, on the one hand, by the geometrical arrangment of the transducers in the receiving system and, on the other hand, by the propagation speed of the impinging signals in the transmission medium. The circuit arrangement includes a memory, a circuit for the reading in and the directed reading out of received signals and a subsequently connected adding circuit having an output at which the group signals of the group characteristics appear in succession.

The U.S. Pat. to Anderson No. 3,039,094 discloses a directionally energized detection apparatus for the determination of the direction of impingement of signals arriving at transducers of a receiving system in a planar wavefront by forming group signals. The signals arriving at the transducers are converted into electrical signals by the transducers, the resulting signals are limited and then read in parallel into memories in the form of shift registers or magnetic core memories at a given clock repetition rate so that time delays are obtained for the received signals from the individual transducers. The transducers are thus compensated electrically to form, in effect, a straight line, a reference line perpendicular to the direction of the impinging signals, and consequently form the desired group characteristic. The delayed received signals are read out of the memories from memory locations whose positions correspond to the required time delays at the given clock repetition rate and are then summed to form group signals.

According to the German Published Patent Application (Auslegescrift) No. 1,278,891, which corresponds to British Patent No. 1,075,375, it is also known to read out delayed, limited received signals directly from a magnetic core memory by means of a single read-out line. In such a case, the limited received signals from each transducer are read in succession into a respective first memory core of each row of the magnetic core memory via respective gate circuits within one time interval, and simultaneously within the rows of the magnetic core memory the limited received signals are transferred in succession into the next column. One read-out lead is brought through each magnetic core of a row and of that column which corresponds to the required time delay for the direction of a desired group characteristic. At the output of each read-out lead there thus appears the succession of delayed received signals which, when integrated, represent the group signals of the desired group characteristic. The read-out lead on which the largest group signal appears contains the group characteristic pointing in the direction of the impinging signals.

The significant drawback of the above-mentioned two prior art circuit arrangements for evaluating the received signals is that the amplitude information is lost due to the required limiting, so that the so-called "antenna" gain, i.e., the reinforcement of the group characteristic, is only slight. The German Published Patent Application (Ayslegeschrift) No. 1,278,891 does disclose a modified circuit arrangement which attempts to eliminate this draw-back by a recoding of the received signals, for example by analog-digital conversion. However, the additional requirement of identically constructed magnetic core memories then corresponds to the number of digits of the recoded signal and is thus undesirably very high.

The U.S. Pat. to Autrey No. 3,356,989 proposes, for the same problem, a decoding according to a delta modulation so that the requirement for memories is reduced since only one shift register is required for each transducer to produce the time delay for the recoded received signals. The length of the shift registers, at a given clock pulse repetition rate, is, however, not only different for each transducer but must also be varied if differently directed group characteristics are to be formed. The recoded received signals are fed into the shift registers via gate circuits which themselves must be controlled in dependence on the number of the desired group characteristics. The recoded, delayed received signals at the output of the shift registers are fed to an adder which is connected, via further gate circuits, with the demodulators for the individual group signals of the different group characteristics.

All of these above-mentioned, known circuit arrangements provide at least one separate time delay having a read-in point for the respective received signal from each individual transducer. The memory requirement is thus relatively high. All transducers are always connected, either directly or via gate circuits, with one read-in point of the memory through which the received signals are read in either simultaneously or in succession. The reading out and adding produces the group signal for each group characteristic.

According to the British Patent No. 1,212,106, which corresponds to German Laid Open Patent Application (Offenlegungs-schrift) No. 1,616,223, it is also known to employ a single memory for the respective time delays for received signals to form group signals for adjacent group characteristics, i.e. no longer is one memory for each individual transducer required, in order to reduce substantially the entire circuitry involved when a circular arrangement of transducers is employed. Analog signals from the transducers of a group, two of which are disposed symmetrically to the direction of the group characteristic to be formed, are fed into equidistant inputs of an analog delay line at whose sole output the summed group signals appear after a total delay period resulting from the distance between the transducer receiving the first impinging wavefront and the reference line perpendicular to the direction of the group characteristic to be formed. In order to obtain cyclically consecutive group signals for adjacent group characteristics, the connections between the transducers of one group and the inputs of the delay line are effected by switching circuitry which cyclically advances the inputs to the delay line by one transducer when the first group signal has been received to then connect the next group of transducers with the inputs. The delay line thus has as many read-in locations as there are transducers in a group. At the output of the delay line the group signals appear in succession and point in radial directions which are shifted by an angle equal to the distance between two adjacent transducers. Access to the individually delayed received signals is unfortunately not possible in this known circuit arrangement so that, for example, a correlation of delayed received signals from adjacent transducers cannot be accomplished.

An analog delay line usually conventionally comprises series-connected, frequency dependent four-terminal networks which must be carefully matched and checked after assembly. A digital delay, in the form of magnetic core memories or shift registers, has the great advantage compared thereto that it can be used at once without matching or balancing as soon as it comes from the production line. Furthermore, the fabrication of shift registers, using integrated circuit techniques, is incomparably less expensive than conventional analog delay lines. The space requirement for analog delay lines is much greater than that for shift registers or magnetic core memories which furnish the same delay times with the same accuracy.

The German Laid Open Patent Application (Offenlegungsschrift) No. 2,029,712 discloses a circuit arrangement having only a single shift register for the time delay of received signals. The received signals from a group of transducers are read out simultaneously at equidistant time intervals determined by the output from a clock pulse generator, are recoded, for example in a binary code, and fed to gate circuits. The shift register which also has its clock pulse input connected to the clock pulse generator, receives a signal "log 1" which circulates at the clock pulse repetition rate. The shift register furnishes the required delays by the appearance of the signal "log 1" at one of its outputs. These outputs are connected with gate circuits and switch the coded received signals through when the wavefront has reached the associated transducer. The gate circuits are connected to an adder at whose output appears the group signal of this group characteristic after decoding. A plurality of gate circuits and one adder are provided for each group characteristic. The largest group signal indicates the direction of the signal impinging on the transducers.

Such known circuit arrangements are characterized by great simplicity in the memory portion; however, their decisive drawback lies in the plurality of analog-digital converters which must be equal to the number of transducers in the entire receiving system and in the number of adders which must be equal to the number of group signals to be formed.

In summary it can be seen that the numerous known proposed solutions for the present problem still exhibit considerable drawbacks with respect to their practical applicability. It is disadvantageous, during processing of received signals for the formation of group signals in order to determine the direction of the impinging signals by means of group characteristics, that the momentary time values of the received signals are lost by signal limiting. On the other hand, it is disadvantageous, when considering the momentary values, to use an analog delay line, since such known circuit arrangements do not permit access to the individual delayed received signals. When the received signals of each individual transducer are recoded, as in some of the known circuit arrangements, one coder must be provided for each transducer and one decoder for each group characteristic so that generally the plurality of digital memories, which is equal to the plurality of transducers, is increased by the number of digits in the digital code. Generally, the number of the adders and decoders is also dependent on the number of group signals to be formed so that the known solutions constitute severe drawbacks either with respect to the required circuitry or with respect to the limitation of the signal processing possibilities.

SUMMARY OF THE INVENTION

It is the principal object of the present invention to provide a circuit arrangement which permits the formation of group signals for adjacent group characteristics with a justifiable amount of circuitry and which not only responds to phase information but also to voltage levels produced by the received signals over time, i.e., their momentary values, and which additionally permits access to the received signals which have been delayed, as desired, to effect further signal processing.

The solution of this problem is based on the consideration that in circuit arrangements according to the state of the art the circuitry is substantially determined, inter alia, by the number of adders for each of the desired group signals. It was therefore important to find a solution in which one and the same adding circuit can be used for all of the group signals. It was also intended, when digital signals were used, to require only a single coder and decoder for the digital processing of the received signals.

The foregoing object, as well as others which will become apparent from the text below, is accomplished in accordance with the present invention by providing a circuit arrangement for forming a time sequence of group signals in the ranging art, particularly in the sonar art and preferably for a receiving system for signals impinging in a planar wavefront for a momentarily effective characteristic of a group of adjacent group characteristics obtained from received signals originating from a number $n$ of adjacently aligned transducers from a larger plurality of $m$ transducers in the signal receiving system. The group signals are formed by varied, quantized time delays determined by the geometrical arrangement of the plurality of $m$ transducers in the receiving system and by the propagation speed of impinging signals in the transmission medium.

An input circuit coupled to the plurality of $m$ transducers is provided for the repeated, consecutive, interrogation of each individual transducer $Wi$, where $i$ equals $1, \ldots, m$, of the plurality of $m$ transducers. A memory circuit is provided for storing the interrogating signals. The memory circuit has (1) a read-in point coupled to the output of the input circuit and (2) a plurality of memory locations which are sequentially removed with respect to the read-in point. The number of memory locations is at least determined by the maximum time delay for the first received signal. The memory circuit stores the signals so that each read-in interrogated received signal consecutively occupies in steps the memory locations which are further removed with respect to the read-in point. An output circuit coupled to the memory circuit is provided for the destruction-free read-out of stored interrogated signals which were received from adjacent transducers $W2j$ where $2j$ equals 1, 2, ... $n$, of a number $n$ of the plurality of memory locations which correspond to the required time delays with respect to the read-in point. An adding circuit is coupled to the output circuit. The desired group signals derived from the received signals, appear in succession at the output from the adding circuit.

The present invention is characterized, in particular, (a) by an input circuit arrangement for the repeated, consecutive interrogation of the respective momentarily received signal from each transducer of a plurality of $m$ transducers in adjacent sequence and for reading in these received signals, in succession, by a read-in point in the same sequence, into a single memory in which each read-in received signal takes a more distantly located memory location from the read-in point, with the number of memory locations being determined at least and preferably by the maximum time delay for the first interrogated received signal; (b) by an output circuitry for the undestructive read-out of stored received signals from $n$ adjacent transducers from memory locations which correspond to the required time delay with respect to the read-in point, and (c) by an adding circuit connected to the output circuitry at whose output the group signals from $n$ received signals appear in succession.

The momentary values of the received signals at a plurality $m$ of the transducers are interrogated repeatedly, according to the present invention, in a time sequence and in adjacent order by means of clock pulses of a given repetition rate which is twice as great as a maximum frequency of the received signals to be processed multiplied by the plurality $m$ of the transducers. The individually interrogated momentary signal values present in a time series are read one after the other in the same sequence via only the single read-in point into the single memory, which has a single row (i.e. no longer one memory row per transducer), with the same clock pulse repetition rate and in such a manner that the last interrogated momentary signal value is supplied to the first memory location of the single memory subsequent to the read-in point. The momentary signal value previously stored there simultaneously moves to the next memory location and all older stored momentary signal values also move into an adjacent memory position which is further removed from the read-in point.

If the $m$ transducers are arranged in a circle, for example, and if only a smaller number $n$ of adjacent transducers is used to form a group characteristic, a reference line constituting a connection between the two outer ones of the $n$ transducers lies perpendicular to the direction of the group characteristic to be obtained. The perpendicular line from each transducer to this reference line, divided by the propagation speed of the impinging signals in the transmission medium, is equal to the required time delay for the received signal of the transducer. The maximum time delay determines the number of memory locations in the single memory required for this solution so that the received signal first interrogated from a transducer is contained at the end of the maximum time delay, usually only after this transducer has been interrogated repeatedly, in the last memory location of the single memory. In the penultimate memory location there is simultaneously the momentary value of the received signal of the adjacent, i.e. second transducer in the interrogation direction, which signal was received by this second transducer at a previous time, the time difference being equal to the maximum time delay minus the time of a step between two interrogation times of the two adjacent transducers in the interrogation direction. However, since the wavefront has moved in the period between the two interrogation times, i.e. in the time of one step which is equal to the reciprocal value of the clock pulse repetition rate in the direction toward the reference line at its propagation speed, the momentary value at this second transducer is generally different from the momentary value at the first transducer at the moment of interrogation of the first transducer and also different from the momentary value at the first transducer at the moment of interrogation of the second transducer. After a time which expires possibly only after repeated interrogation of the momentary values of the received signals at the second transducer, the wavefront reaches this second transducer so that now the momentary value of its received signal is equal to the momentary value first interrogated at the first transducer. Thus identical momentary values appear once at all transducers at different points in time. When the first interrogated received signal has reached the last memory location, these identical momentary values are also contained in different memory locations of the single memory.

To form the group signal, interrogation points are provided at those n memory locations in which identical momentary values from n transducers are present, i.e. memory locations which correspond to the required time delays with respect to the read-in point. In other words, the spaces between the interrogation points correspond to the times required by the wavefront to traverse the path from one transducer to the adjacent transducer in the propagation direction. These interrogation points are connected by the output circuit with an adder in which the group signal is formed for this group characteristic. The group characteristic points in a radial direction and contains the received signals of n adjacent transducers half of which, $0.5n$ transducers, are positioned resepctively on each side of the direction of impingement of the wavefront.

Subsequently, after the step period which is equal to the reciprocal value of the clock pulse repetition rate, the first interrogated momentary value of the received signal of the second transducer, which is adjacent to the first transducer in the interrogation direction, is disposed in the last memory position. All other stored received signals have also moved on by one memory position. At all memory locations provided with interrogation points there now are the momentary values of those n transducers which are used to form a group signal for a group characteristic adjacent to the first group characteristic. This group characteristic also points in radial direction and is shifted, with respect to the first characteristic by the angle between adjacent transducers in the interrogation direction.

Thus group signals from adjacent group characteristics appear in succession at the output of the adding circuit in synchronism with the interrogation of the momentary values of the received signals from the transducers.

The interrogation of the received signals in time sequence at each of the m transducers is effected by a scanner, which is preferably a so-called multiplexer constructed using integrated circuit techniques. According to a program in its control circuit fed at the clock pulse repetition rate the multiplexer switches its inputs, which are connected with the $m$ transducers, in succession to its sole output which is connected with the read-in point of the single memory. The memory for the momentary values is, for example, a magnetic tape or a connected chain of four-terminal networks.

This type of interrogation produces the great advantage of requiring only the single memory which has only a single read-in point for all of the transducers and which nevertheless permits reading out of the arbitrarily delayed received signals from all transducers from the respective memory locations (by approximately arranged magnetic sound heads or four-terminal outputs) without erasing them. After read-out the individual delayed received signals can then be processed, for example by correlation. Furthermore, only the single adder is required in an advantageous manner for the formation of the whole time sequence of group signals for $m$ adjacent group characteristics.

This solution according to the present invention is not limited to the use of a certain type of memory, such as only analog or only digital memories. In order to eliminate the use of an analog memory with the inherent known difficulties, such as space requirements, production and matching problems, an advantageous further embodiment of the present invention provides that a single binary coder in the form of an analog-digital converter be connected to the multiplexer, the coder being connected to a digital memory. This embodiment has the particular advantage, in practical use, that it is able to process many information-bearing signals with inexpensive standard components and low space requirements.

The individual, interrogated momentary values of the received signals are digitalized in succession at a rate determined by the clock pulse repetition rate which also controls the multiplexer. The bits of each coded momentary signal value appear either serially in the period of a step which is equal to the time between two interrogation points, at a single output of an analog-digital converter or, in another embodiment, in parallel at parallel outputs of an analog-digital converter to which is connected a digital memory in the form of a magnetic core memory or shift register.

Using serial binary codes, the bits representing a momentary signal value are read into the memory in the period of a step, the memory consisting, in a possible embodiment, of a single chain of series-connected shift registers. Each shift register has so many memory cells that the digital momentary signal values from all transducers in one interrogation cycle can be stored therein. Thus, if the receiving system consists of $m$ transducers and each momentary signal value consists of $z$ bits, a shift register has $m$ times $z$ memory cells, $z$ associated memory cells being a memory location and $m$ memory locations forming a memory unit. After an interrogation cycle has been completed, one cycle period has been completed which is equal to $m$ steps, and the next interrogation cycle begins. The number of series-connected shift registers each having $m$ memory locations is determined by the maximum required time delay for the received signals in order to form a group signal.

The output circuitry, in its basic form, is preferably provided by permanent connections to the inputs of a binary series adder from those outputs of the memory associated with those particular memory locations which have the required time delays for the individual received signals at the $n$ transducers in order to form a given group signal. The adding circuit in the form of a binary series adder furnishes, via a single digital-analog converter, the decoded, timely consecutive group signals for adjacent group characteristics.

When the momentary values are coded to $z$ parallel bits, which in the present-day state of the circuit art requires less time than coding into serial bits, the parallel outputs of an analog-digital converter are connected with parallel chains of series-connected shift registers as the digital memory. Each shift register has $m$ memory cells and parallel shift registers form a memory unit with $m$ memory locations. The memory locations, corresponding to the time delays for the received signals from the $n$ transducers, are each connected with $z$ inputs of a binary parallel adder to which is connected a single decoder in the form of a digital-analog converter. The connections between the corresponding memory locations and the parallel adder constitute the output circuitry. The group signals for the adjacent group characteristics again appear in succession at the output of the decoder.

In the circuit and wiring art it is always of great advantage to reduce the requirement for conductive paths. This is important particularly when integrated circuit modules are employed, because although the space requirement for the modules is very small, the space requirement for conductive paths is relatively large even when printed circuit boards are employed.

In a further development of the present invention the requirement for conductive paths between the memory and the adding circuit is greatly reduced in that two partial signals are formed for each group signal. For each group characteristic to be formed, particularly when the transducers are arranged in a circle, two transducers of the group consisting of n transducers are symmetrically disposed with respect to the direction of the group characteristic so that the received signals of these two require the same time delay. In this instance, if the received signals with the correct time delay from those transducers which lie in a half group on one side of the direction of the group characteristic are added together, two identical partial signals of the group signal are received. To save on conductive paths the received signals with the same time delays are taken off from only one memory location. However, since they originate from two different transducers and were interrogated and stored at two different interrogation times, special steps must be taken with respect to their processing in the adder.

At a certain point in time the momentary signal values belonging to a single transducer are present as bits at the outputs of all memory units, which momentary signal values are received by this transducer at the different interrogation times. A cycle period, which is equal to the $m$-fold step time, always lies between the individual interrogation times. After the step time, which always lies between the scanning of two adjacent transducers, the momentary signal values belonging to the transducer adjacent in the interrogation direction will then appear at the same outputs of the memory units.

After a time $0.5n$ divided by the clock pulse repetition rate, called the half group time, i.e., when the scanner has interrogated the last transducer of the half group under consideration, the received signals of the $0.5n$ transducers have appeared at the outputs of all memory units to form a partial signal, of one group signal. The scanner then scans the transducers whose received signals are not used to form this one of the group signals. After a time $(m - n)$ divided by the clock pulse repetition rate, i.e., after the time which is equal to the cycle period minus twice the half group time, the scanner reaches the first transducer of the other half group consisting of $0.5n$ transducers to form the second partial signal of the same group signal. Within the half group time these $0.5n$ transducers are also scanned and the momentary values of their respective received signals appear at the outputs of the memory units at the different interrogation times. Only those outputs of those memory units which correspond to the time delays for the received signals of the respective $0.5n$ transducers on both sides of the direction under consideration are used as the outputs of the memory. The number of outputs of interrogation points of the memory to be used for a complete group signal consisting of the received signals from the $n$ transducers with the correct time delay is thus reduced to one half.

Two different ways for forming the partial signals are particularly advantageous for this further development of the present invention, i.e., a summation of the individual digitalized momentary values for each partial signal as they appear in succession at the outputs of the respective memory units either simultaneously after the half group time or within the half group time in steps from memory unit to memory unit.

For the simultaneous summation, the outputs of the respective memory units are connected with further shift registers whose memory capacity differs from the adjacent one by one memory cell unit. For a parallel binary code one memory cell unit is identical with one memory cell and for a serial binary code one memory cell unit is identical with $z$ series-connected memory cells. To form the first partial signal the last memory unit is connected via the shift register with the greatest storage capacity and the input of the memory is connected directly with a partial adder of the adding circuit. The shift register with the greatest storage capacity stores the longest delayed received signal for the half group time minus the step time, the last received signal for forming the first partial signal only then being present at the input of the memory. All other outputs of the memory are also connected with the partial adder via the appropriately shorter shift registers, the first partial signal appearing at the output of the partial adder after the half group time.

The second partial signal is formed in the same manner in that the shift register with the greatest storage capacity is connected to the input of the memory and the output of the last memory unit is connected directly with a second partial adder for the second partial signal. After the first partial signal has appeared after the half group time at the output of the first partial adder, the scanner scans the transducers which are not used to form the first group signal. After the time which is equal to the cycle period minus twice the half group time with reference to the time of the first interrogated transducer, the first received signal required to form the second partial signal appears at the input of the memory. This input signal is stored in the shift register with the greatest storage capacity for the duration of the half group time minus the step time because only then the received signal of the last transducer for forming the second partial signal with the corresponding greatest time delay appears at the output of the last memory unit of the memory. At the output of the second partial adder the second partial signal appears later, by the travel time minus the half group time, than the first partial signal. To form the group signal the first partial signal is stored in a further delay circuit for this time and then fed to a final adder whose second input is directly connected with the second partial adder for the second partial signal. The two partial adders and the final adder together form the adding circuit, which at its output shows the time sequence of the group signals via a binary decoder in the form of a digital-analog converter.

This simultaneous summing of a digital partial signal has the advantage that only a single partial adder is required per partial signal which effects the addition in parallel during the step time.

In the alternative embodiment using step-wise adding of the two partial signals, the adding circuit consists of two partial adders having $(0.5n-1)$ partial step adders and a final adder. The $(0.5n-1)$ partial step adders of a partial adder are effectively aligned via a delay member having a delay which is equal to the step time. The delay member is positioned between the output of the one partial step adder and an input of the next partial step adder.

To form the first partial signal, the first of the partial step adders of the first partial adder has its one input connected via the delay member to the last memory unit and has its other input connected to the memory unit providing the second longest time delay. The other partial step adders have their free inputs connected in sequence to the memory units for increasingly shorter time delays, the last partial step adder being connected to the input of the memory. The output of the last step adder is the output of the first partial adder for the first partial signal, which is stored in the delay circuit for the cycle period minus the half group time, and is fed to the final adder.

In order to form the second partial signal, the first partial step adder of the second partial adder has its one input connected via the delay member to the input of the memory circuit and has its second input connected to the output of the memory unit for the next longer time delay. The next following partial step adders have their free inputs connected respectively to the outputs of the respective memory units for the next longer time delays, the last partial step adder being connected to the output of the last memory unit. The output of the last partial step adder is the output of the second partial adder and furnishes the second partial signal.

Delay members are positioned between the individual partial step adders and provide delay time corresponding to step time, since after each summing the next received signal to be summed from the next scanned transducer appears at the output of the memory unit after one step period which memory unit corresponds to the time delay for this transducer. This received signal apearing at the output of the memory unit is then added to the previously formed sum.

The alternative of the step-wise adding permits, so far as the present state of the circuit art is concerned, the processing of binary signals with a substantially greater number of bits in much shorter times than the simultaneous parallel summing in which not only two but $0.5n$ signals are simultaneously summed. As a practical matter, it depends on the actual problem involved which type of partial addition is to be preferred in any given situation.

The forming of two partial signals having a defined time spacing with respect to one another produces the advantageous possibility of improving the signal to noise ratio, for example by means of correlation. The possibility of connecting other specific known signal processing elements, for which it is not enough to have only the complete group signal available, is also advantageous.

A sharper bundling of a group characteristic is known to be obtained if the individual received signals are given staggered values as it is taught, for example, in the book by R. C. Hansen *MICROWAVE SCANNING ANTENNAS*, Academic Press, New York, London, (1964). In the apparatus according to an advantageous variation of the present invention, the delayed received signals are multiplied in a multiplier for this purpose by staggered values and the resulting products are added in the above-described manner as weighted delayed received signals.

In different receiving systems having differing geometric arrangements of the transducers and thus different required time delays for the received signals which are different than the delays provided for a circular arrangement of the transducers, a further development of the present invention provides that the outputs of all memory units of the memory be connected with a controllable selector switch as the output circuit arrangement. This selector switch permits switching of the inputs of the multiplier or the adding circuit, respectively, to different memory units, depending on the required time delays based on the particular given geometric arrangement of the transducers. Because the staggered values also depend on the geometric arrangement of the transducers, it is moreover advisable to couple the selector switch to a further switch which simultaneously feeds the newly required staggered values into the multiplier.

The particular advantages of the circuit arrangement according to the present invention are that, based on the time sequence of the scanning of the momentary received signals of the transducers only a single memory with only a single read-in point is required and that for digital processing only a single binary coder is used. With digital processing the memory consists of shift registers of the same length as the memory units which for serial coding are all connected in series. For coding of each received signal into simultaneously present parallel bits, a memory consisting of parallel chains of series-connected equidistant shift registers is used to produce the delay, a parallel coding at the present state of the circuit art being possible in a shorter time than serial coding. To form each group signal the same adding circuit is always used at whose output the group signals for the adjacent group characteristics appear in time sequence. The time sequence of the group signals is furthermore advantageous for display on a luminescent screen; for example, an indicator on the screen rotates according to the scanning clock pulse repetition rate and the illuminated length of the indicator always equals the value of the group signals. Radial positions of the illuminated length of the indicator then indicate the direction and intensity of the impinging signals, a reference direction being also shown on the screen in a known manner.

It is furthermore advantageous that the individual delayed received signals can be obtained from the memory so that an improvement of the degree of bundling of the group characteristic is given by weighting the individual received signals with staggered values which are adapted to the given geometric arrangement of the transducers; a formation of a time sequence of partial signals is also possible which, with skilled further processing, permits improvement of the signal to noise ratio.

Several circuit arrangements are known in the sonar art for the evaluation of such group signals, particularly for removal of interference, which arrangements employ multiplying methods.

It is also known to evaluate a time sequence of group signals parallel in time in that the group signals per group characteristic are each fed into a processing channel. The plurality of processing channels is then equal to the plurality of group characteristics. It is also known to free group signals of a group characteristic from their interference components by multiplication and subsequent integration. Since for such processing of the group signals a processing channel with a multiplier and a subsequently connected integrator must be provided for each group characteristic, the circuitry required for this is very large.

It would therefore be advantageous to provide a circuit arrangement for processing the time sequence of group signals or their two partial signals, which arrangement processes the group signals in a time series in the case of digital processing, with the suitable use of known circuit means from the digital filter art. The proposed circuit arrangement comprises only a single signal processing channel in spite of the plurality of different group characteristics involved.

A circuit arrangement for processing the time sequence of group signals or their partial signals is constructed, according to the present invention, of only a single multiplier with an integrator connected with an adding circuit both inputs of the multiplier being linked to the adding circuit. The integrator consists of an adder with a delay line memory connected thereto and with a feedback branch, a first input of the adder being the input of the integrator. The delay line memory consists of a plurality of series-connected memory locations and is operated at the clock pulse petition rate. The feedback branch is provided in the form of a multiplier with multiplicand generator whose first input is connected with the output of the delay line memory and whose output is connected to a second input of the adder. The second input of the multiplier is connected to the multiplicand generator for a settable multiplication value, the multiplication value determining the integration period of the integrator and having a value which is smaller than the decimal value "1" by a deviation, the time sequence of the processed group signals being obtained at the output of the delay line memory as the output from the integrator.

With this solution it is possible to process the group signals in time series using multiplying characteristics. Which multiplying characteristic is to be attained in particular during the processing depends solely on the control of the multiplier, if no changes are made in the circuit arrangement of the present invention. As stated above, it is firstly proposed to provide a circuit arrangement in which a particularly large number of group characteristics and their group signals, as well as a correspondingly good resolution during ranging, are obtained with comparatively little circuitry. The solution according to further improvements leads to an adapted processing circuit whose particular value lies in the fact that in spite of the large number of individual group characteristics only a single processing channel is provided without even the slightest loss of information.

If, for example, the group signals are to be processed as if they were subjected to a quadratic rectification, the two inputs of the multiplier are connected directly to the output of the adding circuit. The squared group signals appear in time sequence at the output of the multiplier. These squared group signals are fed into the adder whose output is connected to the delay line memory. The first squared group signal appears, after its travel time at the output from the delay line memory which is connected with the first input of the multiplier in the feedback branch. The squared group signal is multiplied in the multiplier by the multiplication value and is fed to the adder at the input of the integrator. At this time, the next squared group signal belonging to the same group characteristic is present at the first input of the adder. These two signals are added in the adder and again fed into the delay line memory. Again after the travel time, the sum of the weighted first squared group signal and the second squared group signal appears at the output of the delay line memory. This sum is again multiplied in the multiplier by the multiplication value and fed to the second input of the adder, etc. Since the delay line memory always stores this sum exactly for the travel time, which equals one cycle period, only the group signals from one and the same group characteristic are linked together. Within one cycle period the group signals of all group characteristics are treated correspondingly.

The output of the delay line memory is the output of the integrator at which the processed group signals appear in succession at the intervals of one step time each, which is equal to the reciprocal value of the clock pulse repetition rate. These group signals which are present in a time series can be evaluated, for example, in an indicator device. Since the multiplication value is somewhat less than the decimal value "1," the total result reduces the influence of the older squared group signals with increasing processing time while the latest squared group signal is most nearly fully incorporated in the result at the output from the integrator. If the group signal is the same after each cycle period, the signal at the output of the integrator approaches a limit value which is equal to the squared group signal divided by the deviation by which the multiplication value is less than the decimal value "1." This indicates that this is, strictly speaking, not an integration but rather a time-dependent signal processing; however, the term integrator has been chosen because it is customary in the ranging art when a time-dependent signal evaluation is effected even if this is not based on a strictly mathematical integration.

The circuit arrangement according to preferred embodiments of the present invention has an integration period which is dependent on the cycle period since the delay line memory in the integrator is operated at the clock pulse repetition rate and has a specific number of memory locations which is equal to the plurality of group characteristics. Moreover, the integration time is dependent on the selected multiplication value. The integration time results as a quotient of the cycle period divided by the deviation of the multiplication value from the decimal value "1," since after the integration period a one-time input signal has dropped to its value divided by the base of natural logarithms "$e$."

The clock pulse repetition rate is determined by the highest received frequency to be processed from the received signals for forming the group signals. The plurality of memory locations of the delay line memory is determined by the plurality of group characteristics. The only independent variable is the multiplication value. By varying the multiplication value it is possible, on the one hand, to give and to determine the limit value which is approached by a group signal constant at the input when it appears processed at the output of the integrator, and on the other hand the integration period. Since the multiplication value is entirely independent of the prior processing of the received signals, there exists the great advantage that the integration period can be varied in the multiplicand generator depending on the given application to which the invention is applied.

The circuit arrangement according to a preferred embodiment of the present invention can be used with just as much advantage for a half-wave rectification if it is slightly modified. In a comparator, which is connected to the output of the adding circuit the momentary group signal is compared with a comparison signal. Depending on the value of the momentary group signal with reference to the comparison signal, there appears respectively at the output of the comparator the value "+1" or "0." The output of the comparator and the output of the adding circuit are each connected with an input of the multiplier. In this type of control for the multiplier the half-wave rectified group signals appear at the output of the integrator in time series.

For a full-wave rectification of the group signals, the output of the adding circuit is connected to a comparison circuit in which the group signal is compared with the comparison signal. The output states of the comparison circuit, in this case, are "+1" or "−1." At the output of the integrator there appear in succession the individual, processed group signals which, with the same basic circuit, are now subjected to a full-wave rectification.

According to a further preferred feature of the present invention the circuit arrangement can also be used for processing two partial signals of a group signal, such as those formed, as hereinbefore mentioned, from the received signals from the transducers of two half groups. An evaluation of the two partial signals is advantageously possible with the aid of the circuit arrangement according to the present invention in the form of a cross correlation, a so-called phase-controlled correlation or a polarity-coincidence correlation.

For a cross correlation the two partial signals are switched directly to the two inputs of the multiplier. The signal at the output of the subsequently connected integrator then furnishes a measure for the phase shift between the two partial signals of a group signal. The group signals which were processed according to the cross correlation again appear at the output of the integrator in the spacing of the step time and in time series.

A so-called phase-controlled correlation of the two partial signals is possible in the same manner in that the one output of the adding circuit is connected with the input of the multiplier, via a comparison circuit as described above and the other output of the adding circuit is connected directly with the second input of the multiplier. At the output of the integrator there appear in succession the group signals which have been processed according to a phase-controlled correlation.

If both outputs of the adding circuit are connected to the two inputs of the multiplier via comparison circuits, processed group signals can be obtained at the output of the integrator which were linked together according to a polarity coincidence correlation. These three possibilities for processing of group signals from two partial signals can be effected with one and the same circuit arrangement according to preferred embodiments of the present invention by the appropriate switching.

A great advantage of this circuit arrangement according to preferred embodiments of the present invention is that the multiplier with the subsequently connected integrator can be used selectively for a full-wave rectification, a half-wave rectification or a quadratic rectification as well as, in the case of group signals in the form of respective pairs of partial signals, for different cross correlations by the appropriate switching, without the type of circuitry being required which usually is always associated with so many different types of evaluation possibilities for such a large number of group characteristics. This is so because in the circuit arrangement of the preferred embodiments of the present invention the only decisive factor is the application of the basic circuit.

The circuit arrangement according to preferred embodiments of the present invention is just as advantageous for digital as for analog group signals. The modules employed for the multiplicative and additive linking must be replaced with conventional digital modules for the digital application. The memory of the integrator consists of shift registers which are arranged in parallel for parallel coding and which each have the same plurality of memory cells. All parallel memory cells together form a memory location which, connected in series, constitutes the plurality of memory locations. For serial binary coding, these memory locations of the memory each have as many serially disposed memory cells as bit locations at the input of the integrator plus twice a number of bit locations, this number being equal to a number of bit locations for the multiplication value. The multiplication value is set in the multiplicand generator as a binary sequence of digits, its number of bit locations being given by the deviation of the multiplication value from the decimal value "1." Values of these bit locations at the output of the memory serving as the output of the integrator range from positive to negative powers at base "2," the lowest value having as the negative power at base "2" the number of bit locations of the multiplication value, and the highest value having a positive power formed from bit locations at the input of the integrator plus the number of bit locations of the multiplication value.

For the digital processing of the group signals the multiplier with the multiplicand generator in the feedback branch can be realized with particular simplicity according to a further feature of the present invention by an adding circuit, in the form of a binary adder, if the deviation of the multiplication value from the decimal value "1" equals base "2," raised to the power of the number of bit locations of the multiplication value, this number receiving a negative sign in the power. The adding circuit, in a suitable embodiment of this type of basic circuit, has so many bit locations of the same value at its first and second inputs and at its output as has the output of the integrator. The multiplication of a signal at the output of the integrator by the multiplication value is reduced to an addition, the multiplication value being represented as the difference between the decimal value "1" and the deviation. The sum is formed from the signal and an intermediate product. The intermediate product is the negated signal at the output of the integrator multiplied by the deviation. This intermediate product is obtained very simply by shifting the value of the individual bit locations of the negated signal by the number which, as a power at base "2," results in the deviation toward a lower value. Thus no circuitry needs to be provided for a true multiplication to obtain the intermediate product.

In the above described circuit for the multiplication of the signal at the output of the integrator with the multipliation value there still is a system error, which, however, can be very easily eliminated for the bit location with the lowest of all values at the input of the adding circuit the switching state "log 1" is always added to the momentary logic switching state. At the output of the adding circuit as the output of the feedback branch there always appears the product of the signal at the output of the integrator and the multiplication value in binary coded form without the use of a multiplier in the feedback branch which would require complicated circuitry and be expensive.

According to the above described circuit, the multiplication in the feedback branch is based on a circuit addition, there remains for a multiplicative linkage only the multiplier which is connected to the adding circuit. One of the most popular techniques of processing partial signals is the polarity coincidence correlation. In such a case, it is of particular advantage if the multiplier is replaced by an identity gate. At the output of the identity gate there then appears a "log 1" whenever both partial signals are in phase coincidence, and a "log 0" whenever both partial signals are not in phase coincidence. The multiplier as the identity gate has at its output only a single bit location with the value "$2^0$."

For this type of processing the integrator has a particularly simple construction, in a further embodiment of the present invention, in that the multiplier together with the multiplicand generator in the feedback branch and the adder at the input of the integrator are all realized by a preadder with a subsequently connected adding circuit. The inputs of the adding circuit are both linked directly and via negation or inverter stages, with a shift in their values, with the bit locations at the output of the integrator. The preadder is connected with its one input to the output of the identity gate and with its other input to the bit location of the highest value at the output of the integrator via a negation member. The preadder has only two outputs each having only one bit location of which one constitutes the carry. The other output which is only connected with the bit location of the value "$2^0$," is connected to one input of the adding circuit, while the output for the carry is simultaneously connected with all bit locations of a higher value at the same input of the adding circuit.

Thus the multiplier for the polarity coincidence correlation has been replaced by a simple identity gate so that the previously very complicated adder at the input of the integrator could be realized by a conceivably simple, one-digit preadder.

DETAILED DESCRIPTION OF THE PREFERRED EMBODIMENTS

Figure 1:
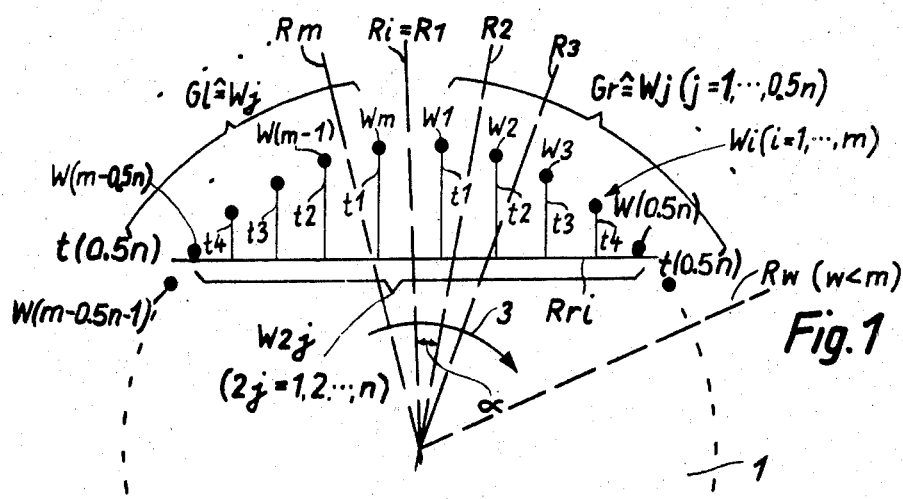
FIG. 1 diagrammatically illustrates a circular arrangement of a plurality of transducers.

FIG. 1 is a diagrammatic representation of a circular arrangement of a plurality $m$ of transducers $Wi$ (where $i=1, \ldots, m$) constituting a signal receiving system designated generally by the numeral 1. The receiving system 1 is operative to form a group characteristic which points in a given direction generally designated $Ri$, a group consisting of $n$ adjacent transducers $W2j$ being used for this purpose. The number $n$ is less than the total plurality $m$. The group of $n$ transducers $W2j$ consists of two half groups $Gr$ and $Gl$, which lie on respective sides of the direction $Ri$; each half group comprises $0.5n$ transducers $Wj$. To form a group characteristic pointing in the specific direction $Ri = R1$, the $0.5n$ transducers $Wj$ (where $j = 1, 2, \ldots, 0.5n$) of the half group $Gr$ and the $0.5n$ transducers $Wj$ (where $j = (m-0.5n), \ldots, m$) of the group $Gl$ are used. When these $n$ transducers $W2j$ have received an impinging signal from a wavefront coming from the direction $R1$, their received signals are subjected to time delays $tj$ (where $j = 1, 2, \ldots, 0.5n$) for further processing. These time delays $tj$ are proportional to a perpendicular from each of the $n$ transducers $W2j$ on a reference line $Rri$, this line being perpendicular to the direction $Ri$ and forming a connecting line between the two outer-most transducers of the transducers $W2j$ which for the direction $R1$ are respectively the transducers $W(0.5n)$ and $W(m - 0.5n)$. The time delays $tj$ can be determined simply by dividing each perpendicular by the propagation speed of the signals in the transmission medium.

To form a group characteristic in direction $R2$ the received signals from the transducers $W2j$ are again used, i.e., those from the transducers $W2$ to $W(0.5n + 0)$ and from the transducers $W(m - 0.5n + 1)$ to $W(m + 1)$, which is identical with $W1$.

The received signals from the transducers $W(m - 0.5n + 1)$ to $W(0.5n + 1)$ require the same respective time delays $tj$ for forming the group signals for the group characteristic in direction $R2$ as the above-mentioned group of $n$ transducers $Wj$ due to the circular arrangement of the transducers $Wi$ since the number $n$ of the transducers is the same for each group and the group characteristic in direction $R2$ always points in a radial direction. The direction $R2$ is shifted with respect to direction $R1$ by an angle $\alpha$ in the direction of rotation as indicated by a curved arrow-headed line 3, which angle $\alpha$ is equal to the angle between two adjacent transducers $W1$, $W2$.

In further processing of the received signals according to the present invention, the transducers $Wi$ are successively interrogated again and again in the direction of rotation 3. A clock pulse repetition rate $Pr$, which is equal to the reciprocal value of the period between two interrogation times of two adjacent transducers $Wi$ and $W(i + 1)$ and which is hereinbelow denominated as the step time $\tau$, is at least twice as great as the maximum received frequency of the impinging signals to be evaluated multiplied by the plurality $m$ of the transducers W$i$.

Figure 2:
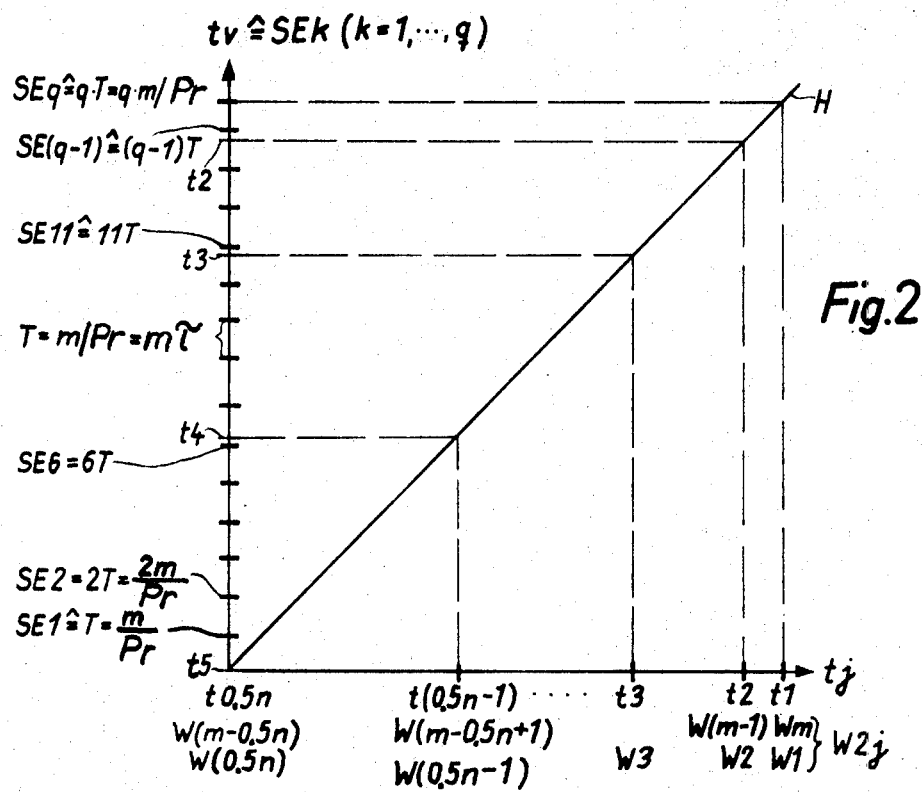
FIG. 2 is a time diagram showing quantized time delays in dependence on the required time delays for an arrangement of transducers as shown in FIG. 1.

FIG. 2 shows a time diagram of realizable time delays $tv$ in dependence on the required time delays $tj$ for the received signals at the n circularly arranged transducers W$2j$ (FIG. 1) for forming a group characteristic if only quantized time delays $tv$ can be realized which are whole number multiples of a unit of time delay. The step time $\tau$ multiplied by the plurality m is selected to be the unit of time delay which hereinbelow is called cycle period T. The cycle period T is that time which has expired when all $m$ transducers W$i$ have been scanned once, i.e., when one interrogation cycle has been completed. All the points at which the required time delays $tj$ equal the realizable time delays $tv$ are disposed on the angle bisector H of the coordinate system shown in the time diagram of FIG. 2. If, however, quantized time delay units, i.e., the cycle period T and its multiples 2T, 3T, . . . , $q$T, are used to realize the required time delay, it is not always the case that the required time delay $tj$ can be accurately realized by a quantized time delay $tv$. Details of the time diagram of FIG. 2 are explained in connection with the circuit descriptions set out below.

Figure 3:
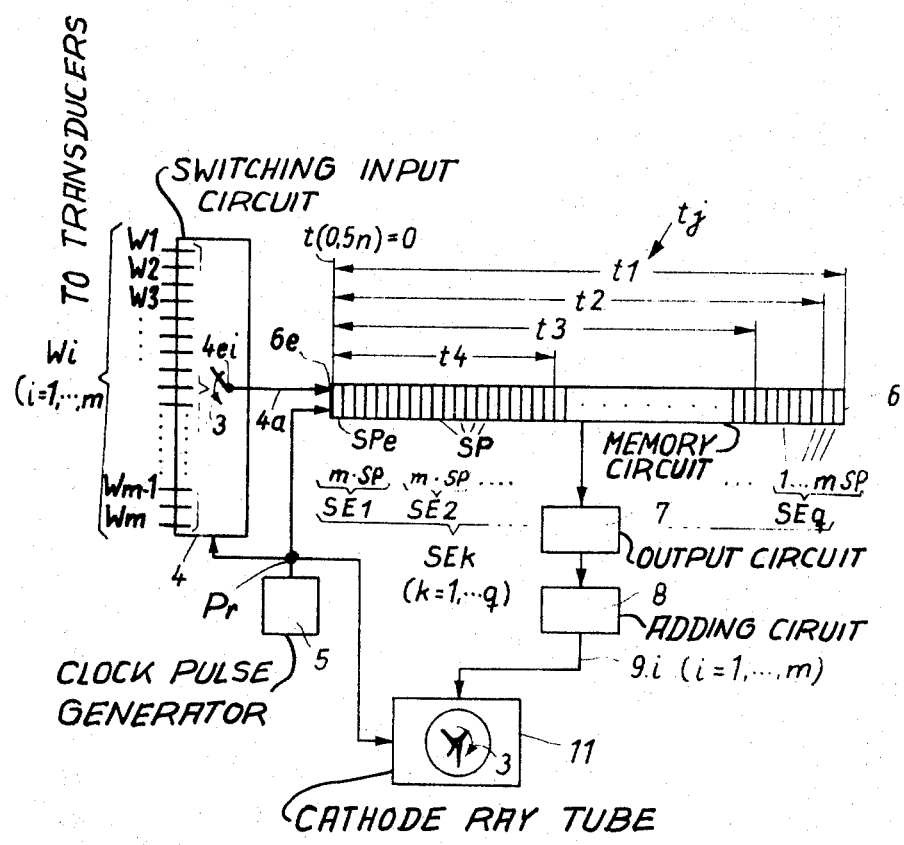
FIG. 3 is a block circuit diagram of a circuit arrangement according to an illustrative embodiment of the present invention.

FIG. 3 is a block circuit diagram of a circuit arrangement according to a first illustrative embodiment of the present invention. The transducers W$i(i = 1, \ldots, m)$ are connected with m inputs generally designated 4e$i$ ($i = 1, \ldots, m$) of an input switching circuit 4. This input switching circuit 4 switches in succession, in response to clock pulses supplied at a clock pulse repetition rate P$r$ from a clock pulse generator 5. The received signals from the transducers W$i$ are thus fed to a single output 4$a$ of the switching circuit 4 and thence to a single read-in point 6$e$ of a memory circuit 6. The memory circuit 6 consists of a plurality of series-connected memory locations SP. The received signals, which have been derived by interrogating the transducers W$i$ in succession, are read into the first memory location SP$e$ via the read-in point 6$e$ in the sequence of the interrogation of the transducers W$i$, the reading in occurring at the clock pulse repetition rate P$r$. With each newly read-in received signal, i.e., with each scanning of the next, adjacent transducer W$(i + 1)$, all previously stored received signals move away from the read-in point 6$e$ by one memory location SP and the first memory location SP$e$ is free for the latest received signal derived from most recently interrogated of the transducers W$i$. When all $m$ transducers W$i$ have been interrogated once, $m$ consecutive memory locations SP of the memory circuit 6 are filled. Every $m$ memory locations SP are considered as one memory unit SE. The scanning of the transducers W$i$ is continuous and the received signals present at the transducers W$i$ at the scanning times are again read into the memory circuit 6. Already read-in received signals are not erased, rather with each scanning step they move one memory location SP further away from the read-in point 6$e$. After $q$ interrogation cycles the last memory location SP of the $q^{th}$ memory unit SE$q$ is occupied with the very first interrogated received signal from the first interrogated transducer W1. The number $q$ of memory units SE$k$ ($k = 1, \ldots, q$) is determined by the maximum required time delay $t1$ and is t1 divided by the cycle period T, as shown in FIG. 2. The very first interrogated received signal from the transducer W1 has thus been shifted, with respect to the read-in point 6$e$, by the time delay $t1$ and is disposed in the last one of the $q$ . $m$ memory locations SP of the memory circuit 6. The received signals from all transducers W$i$ from the $q$ interrogation cycles are disposed in corresponding other memory locations SP which correspond to shorter time delays $t2$, $t3$, . . . $t(0.5n)$ with respect to the read-in point 6$e$. Thus different time delays $tj$ for the received signals must be associated with the different memory locations SP.

The received signal from transducer W1 which was interrogated at a previous time $t1$, is now disposed in the last memory location SP of the memory circuit 6. The received signal from the second transducer W2 with the correct time delay $t2$ is stored in a memory location SP which is only $(m + 1)$ memory locations SP removed from the end of the memory circuit 6 since for a circular arrangement of the transducers W$i$, according to FIG. 2, the required time delay $t2$ is best approximated in the penultimate memory unit SE$(q-1)$ and the received signal from the transducer W2 is stored in the penultimate location SP of this particular memory unit SE$(q-1)$. The abscissa of the time diagram of FIG. 2 shows the memory units SE$k$ for the time delays $tv$, each of the m transducers W$i$ having associated to it a memory location SP within the respective memory unit SE$k$.

For example, at one interrogation time the received signals from the transducer W1 which were derived during different cycle periods T, 2T, 3T, . . . , $q$T are located in the last memory location SP of each memory unit SE$k$, the penultimate memory location SP contains received signals from the transducer W2 which were derived by interrogation at times $\tau$, T + $\tau$, 2T + $\tau$, . . . . and the first memory location SP of each memory unit SE$k$ contains the received signals from transducer W$m$ which were derived at times $m\tau$, T + $m\tau$, . . . .

A group characteristic in direction R1 is formed, according to FIG. 2, when in the last memory unit SE$q$ and within it in the last memory location SP the received signal from transducer W1 with the correct time delay is present, in the penultimate memory unit SE$(q - 1)$ and within it at its penultimate memory location SP there is the received signal for transducer W2 with the correct time delay, in the eleventh memory unit SE11 counted from the read-in point 6$e$ and within this memory unit SE11 at the third memory location SP from the end there is the received signal from the transducer W3 with the correct time delay. In the same manner the received signals of the $n$ transducers W$2j$ with the correct time delay can be found in the corresponding memory units SE$k$.

After the step time $\tau$ all stored received signals have moved over by one memory location SP. To form a group characteristic in the direction R2 the same time delays $tj$ are again required, now for the transducers W2 to W$(0.5n + 1)$ and the transducers W$(m - 0.5n + 1)$ to W$(m + 1)$, which equals W1, i.e., the same memory locations SP which were used to form the group signal of the group characteristic pointing in direction R1.

The memory circuit 6 is connected to an output circuit 7 which is operatively arranged to read out from the memory circuit 6 the received stored signals derived from the individual n transducers W$2j$ with the correct time delay and feeds the read-out signals to an adding circuit 8. At the output of the adding circuit 8, which adds the suitably delayed received signals, there appears a group signal generally designated $9i$, $i$ being equal to $1, \ldots, m$; for the group characteristic pointing in the direction R1, the specific group signal may be designated 91. After the step time $\tau$ a group signal 92 for the group characteristic pointing in the direction R2 appears without any wiring or coupling change in or from the output circuit 7, since all stored received signals have moved over one memory location SP in the memory circuit 6 and the input circuit 4 switches a received signal from the transducer W2 to its output connection 4a which is read, via the single read-in point 6e, into the first memory location SPe of the memory circuit 6. During the cycle period T, which equals $m/Pr$ and equals $m \cdot \tau$ there appear in succession at the output of the adding circuit 8 the group signals $9i$, where $i$ equals $1, \ldots, m$, for group characteristics ointing in the direction $Ri$, where i again equals $1, \ldots, m$. The design of the memory circuit 6 should be selected according to the desired processing of the received signals. When analog signals are to be processed, the memory circuit 6 may, for example, be a magnetic layer store (disc, wire or tape) which moves uniformly below a stationary read-in point 6e and along whose path of movement predetermined pickup points constitute the output circuit 7.

The group signals $9i$, if desired, may be displayed on a cathode-ray tube 11 which produces on its face an indicator which rotates in a direction corresponding to the direction of rotation 3 (FIG. 1). This is accomplished conventionally by a time dependent deflection determined by the pulse repetition rate Pr of the clock pulses from the clock pulse generator 5, the illuminated length of the indicator, at any given deflection direction, corresponding to the size of the respective group signal $9i$ which at that time appears as the output from the adding circuit 8. Radial positions of the illuminated lengths of the indicator indicate the direction and intensity of the impinging signals, a reference direction being included in a known manner on the screen of the cathode-ray tube 11.

Figure 4:
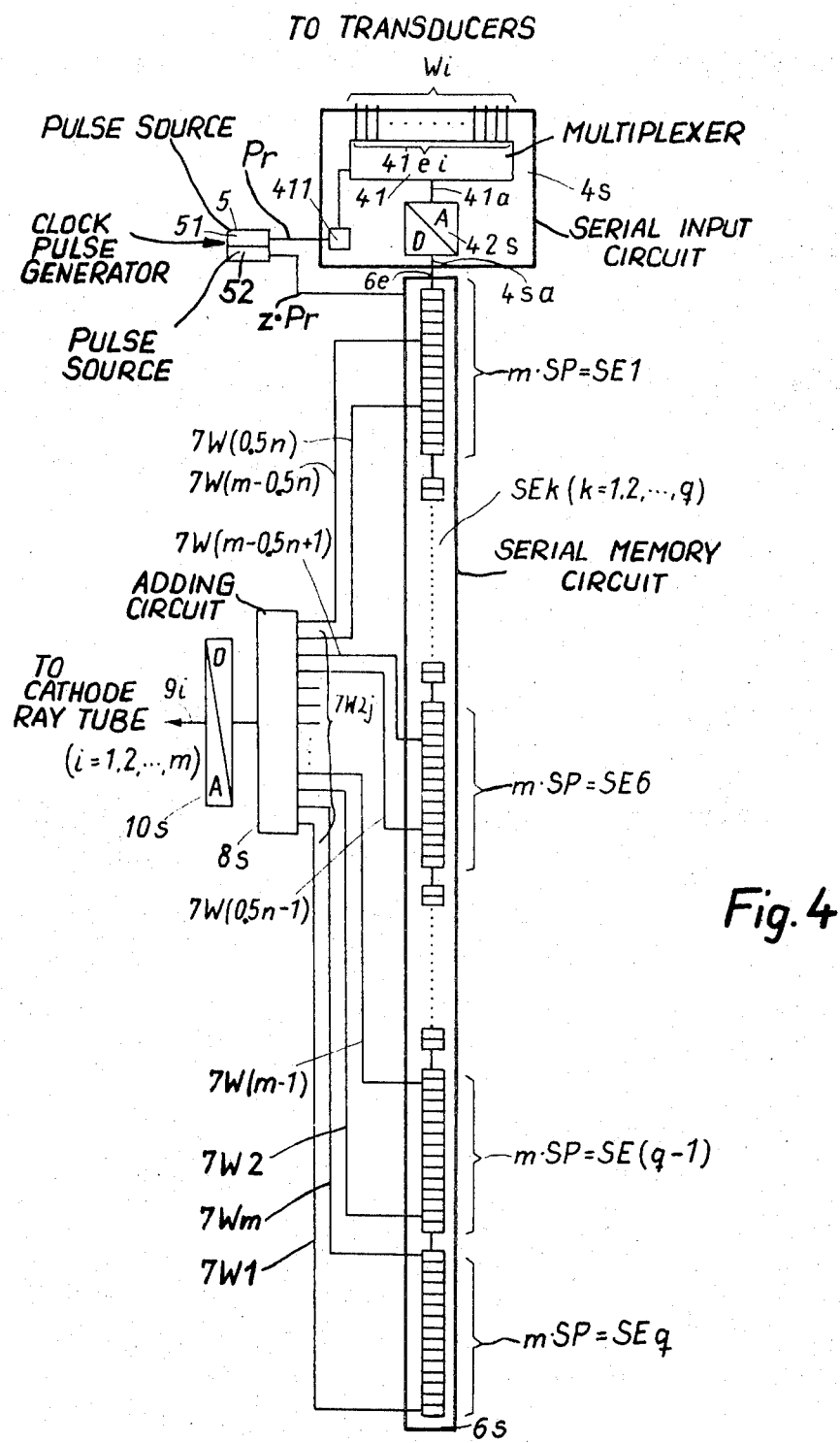
FIG. 4 is a block circuit diagram of a circuit arrangement which is a modification of the embodiment according to FIG. 3, involving serial coding of scanned received signals.

FIG. 4 illustrates an embodiment of the circuit arrangement according to the present invention in which the received signals are not processed as analog values, as in the circuit arrangement of FIG. 3, but rather are coded, according to a serial binary code, into $z$ bits. A serial input circuit $4s$ includes a scanner 41, which is preferably a multiplexer constructed as an integrated circuit, to which is connected a binary coder in the form of an analog-digital converter $42s$ (see Doktor and Steinhauer, DIGITALE ELEKTRONIK IN DER MESSTECHNIK UND DATENVERARBEITUNG, Philips Fachbucher, Volumes I and II, Deutsche Philips GmbH, Hamburg (1971). The scanner 41 is controlled via a preprogrammed control circuit 411 in such a way that its output $41a$ is switched after each step time $\tau$ in succession to its inputs $41ei$, where $i$ equals $1, \ldots, m$, so that after cycle period $T = m\tau$ all of the inputs $41ei$ were once connected with output $41a$. The control circuit 411 is connected with a source 51 of clock pulses supplying clock pulses having a pulse repetition rate Pr, the source 51 being part of a clock pulse generator 5. The analog-digital converter $42s$ converts, during each step time $\tau$ each respective received signal scanned from each respective transducer $Wi$ into a serial bit word composed of $z$ bits which appear at the output $4sa$ of the serial input circuit $4s$ in succession with the timing of the step time $\tau$.

The $z$ bits of a received signal are stored during the step time $\tau$ in a memory circuit constructed as a serial memory circuit $6s$ through a read-in point $6e$. Control pulses from a source 52 having a pulse repetition rate of $z \cdot Pr$ are supplied to the serial memory circuit $6s$ to advance the data stored in the individual stages of the serial memory circuit $6s$. The clock pulse generator 5, of which both sources 51 and 52 form parts, assures synchronism with the clock pulse repetition rate Pr. The serial memory $6s$ contains $q$ memory units $SEk$, $k$ being equal to $1, \ldots, q$. Each memory unit $SEk$ itself has m memory locations SP, each memory location SP consisting of $z$ memory cells. Within the cycle period T a received signal from a transducer $Wi$ passes through one of the memory unit $SEk$. The memory locations SP of the memory units $SEk$, which correspond to the required time delays $tj$, $j$ being equal to $1, \ldots, 0.5n$, (see FIG. 2) are connected to the inputs of a binary serial adder $8s$ serving as an adding circuit, which corresponds to the adding circuit 8 shown in FIG. 3. A serially operating digital-analog converter $10s$ (see ELEKTRONIC INFORMATIONEN, Issue No. 3, Mar., 1961, page 26) is connected to the output of the binary serial adder $8s$. Connections $7W2j$ being equal to $1, \ldots, n$, constitute an output circuit which corresponds to the output circuit 7 as shown symbolically in the block circuit diagram of FIG. 3. At the output of the serially operating digital-analog converter $10s$ appear the group signals $9i$, $i$ being equal to $1, \ldots, m$, in succession at the clock pulse repetition rate Pr. The group signals $9i$ from the digital-analog converter $10s$ may be fed to a cathode ray tube or the like for display in the manner shown in FIG. 3.

Figure 5:
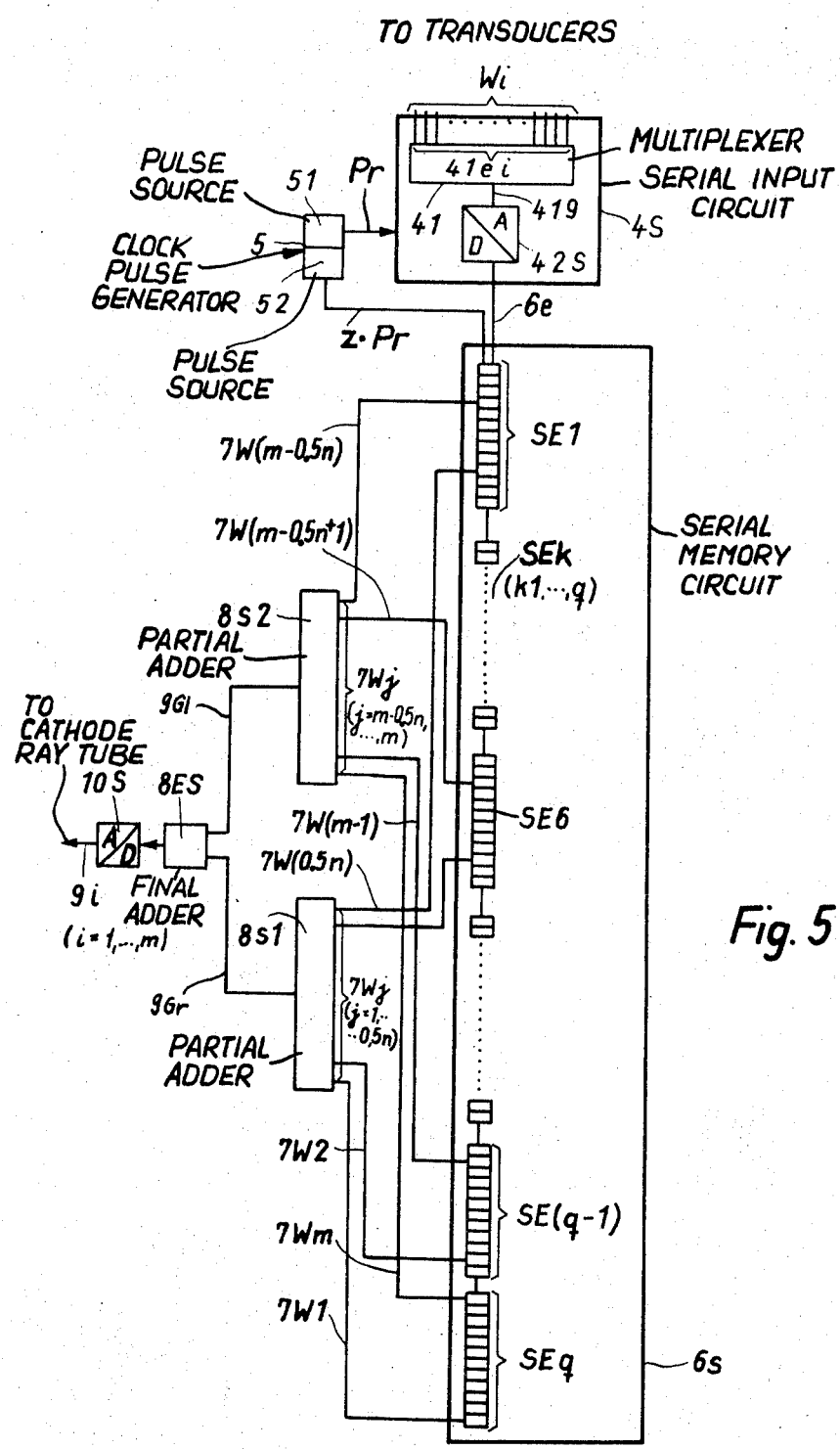
FIG. 5 is a block circuit diagram of a circuit arrangement, which is a modification of the embodiment according to FIG. 4 having two partial adders for forming two partial signals.

With the circuit arrangement according to the embodiment of the present invention shown in FIG. 5 it is possible to produce advantageously, in a simple manner, two partial signals $9Gr$, $9Gl$ of a group signal $9i$.

FIG. 1 shows that a right half group Gr with its $0.5n$ transducers $Wj$ and a left half group Gl with its $0.5n$ transducers $Wj$ are each symmetrical with respect to the direction $Ri$. If the individual received signals belonging to a wavefront of impinging signals are delayed according to the given delays $tj$, two partial signals $9Gr$, $9Gl$ (FIG. 5) are obtained which are identical when the impinging signals directly from direction $Ri$ reach the receiving system 1. The sum of the two partial signals $9Gr$, $9Gl$ is the group signal $9i$.

FIG. 5 shows a preferred embodiment of a circuit arrangement according to the present invention for forming the two partial signals $9Gr$, $9Gl$ with the use of a plurality of transducers $Wi$, a clock pulse generator 5, a serial input circuit $4s$ and a subsequently connected serial memory circuit $6s$ which are arranged with respect to one another, as the similarly numbered circuit parts, shown in FIG. 4. The adding circuit consists of two partial adders $8s1$, $8s2$, to which is connected a final adder $8ES$ for forming the group signal $9i$ from the two partial signals $9Gr$, $9Gl$. The received signals with the correct time delays are fed from the serial memory circuit $6s$ to the partial binary adder $8s1$ via connections $7Wj$, $j$ being equal to $1, \ldots, 0.5n$, and to the partial binary adder $8s2$ via connection $7Wj$, $j$ being equal to $m-0.5n, \ldots, m$. The output signal from the partial binary adder $8s1$ is the partial signal $9Gr$, which is formed from the received signals with the correct time delay of the half group Gr of $0.5n$ transducers $Wj$ which are disposed in the direction of rotation 3 (FIG. 1), when seen from the direction $Ri$ of the group characteristic while an output signal from the partial adder $8s2$ is the partial signal $9Gl$ of those received signals which were received by those $0.5n$ transducers $Wj$ lying in the direction opposite the direction of rotation 3 (FIG. 1), when seen from the direction $Ri$ of the group characteristic. The final adder 8ES is operative to add the two partial signals $9Gl$ and $9Gr$; its output in binary form is fed to a digital-analog converter $10s$. The group signals $9i$ appear at the output from the digital-analog converter $10s$. The group signals $9i$ from the digital-analog converter $10s$ may be fed to a cathode ray tube or the like for display in the manner shown in FIG. 3.

Figure 6:
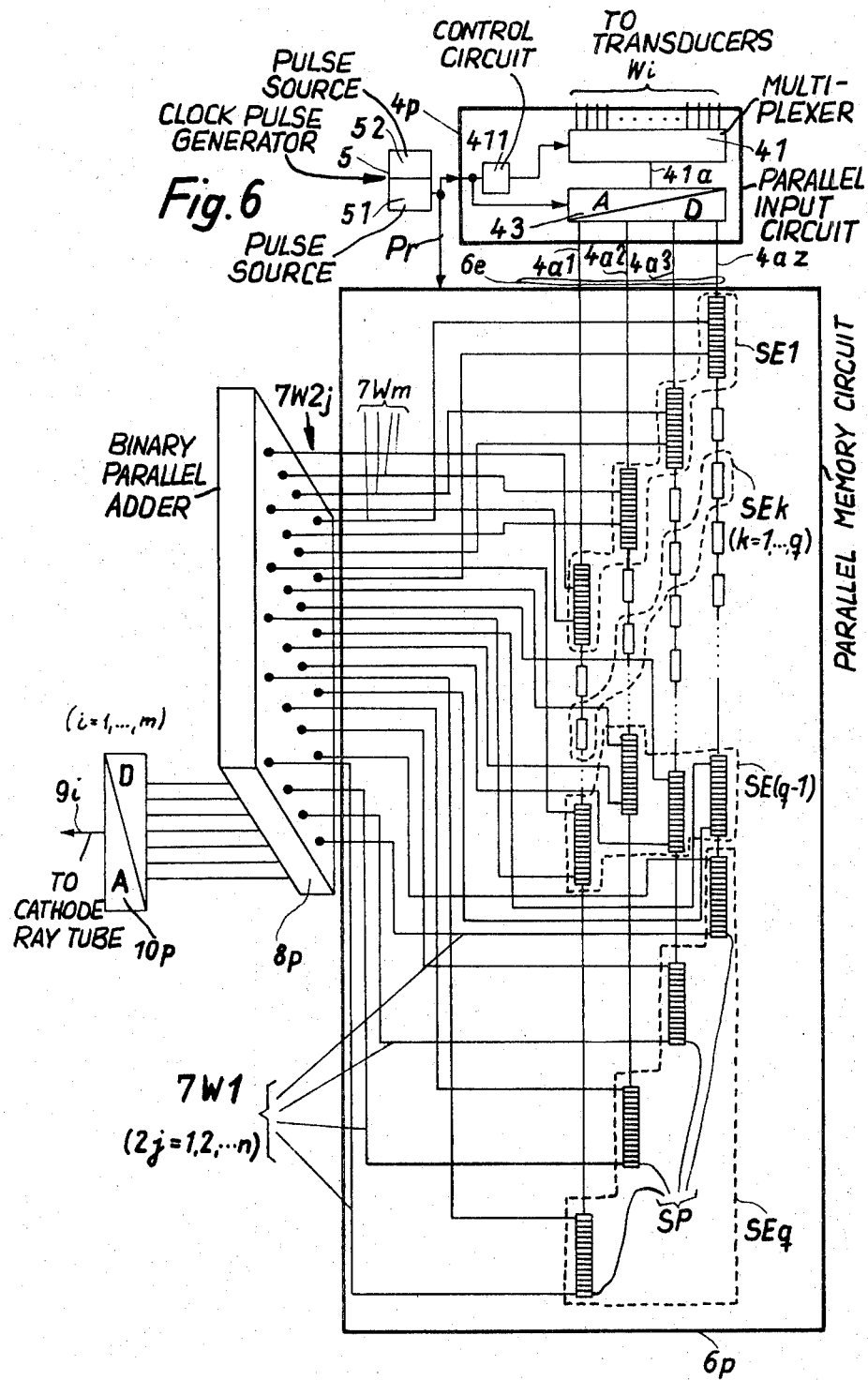
FIG. 6 is a block circuit diagram of a circuit arrangement, which is a modification of the embodiment according to FIG. 3, involving parallel coding of scanned received signals.

A further embodiment of the circuit arrangement according to the present invention with coding of the individual received signals according to a binary code into $z$ parallel bits is illustrated in FIG. 6. A parallel input circuit $4p$ includes a multiplexer 41 which is controlled via a control circuit 411 which itself is connected with a pulse source 51 forming part of a clock pulse generator 5. The sole output $41a$ of the multiplexer 41 is connected with a parallel operating analog-digital converter 43 which has $z$ outputs $4a1, \ldots, 4az$ according to the number $z$ of parallel bits. The $z$ outputs $4a1, \ldots, 4az$ are connected via a $z$-bit parallel input constituting the read-in point $6e$ with a parallel memory circuit $6p$ which constitutes the sole memory circuit for the plurality m of transducers $Wi$ (FIG. 1) which are scanned by the parallel input circuit $4p$ and constitute the receiving system 1 (FIG. 1) to be interrogated.

The parallel memory circuit $6p$ comprises q memory units SEk, $k$ being equal to $1, \ldots, q$, each memory unit SEk consisting of $z$ parallel shift registers. Every $q$ shift registers are connected in series and are connected with their clock pulse inputs (not shown) to the clock pulse source 51 of the clock pulse generator 5. Each memory location SP consists of $z$ parallel memory cells in one of the memory units SEk. The required time delays $tj$ are again obtained in approximation in those memory units which result for the circular arrangement of the transducers $Wi$, as explained in conjunction with FIG. 2. The memory locations SP in the memory units SEk associated with the $n$ transducers $W2j$ (FIG. 1) for forming a group characteristic are fed, via n connections $7W2j$ ($7Wl, \ldots, 7W\,0.5n, 7W\,(m-0.5n), \ldots 7Wm$) constituting the output circuit, which corresponds to the output circuit 7 of FIG. 3, to a binary parallel adder $8p$ constituting the adding circuit and corresponding to the adding circuit 8 shown in FIG. 3.

The required output bit number of the binary parallel adder $8p$ is determined from the number $n$ of the transducers $W2j$ considered for a group signal $9i$ and from the number $z$ of bits of the recoded received signals. A parallel digital-analog converter $10p$ is connected to the binary parallel adder $8p$ which converter furnishes at its output the sequence of group signals $9i$. The group signals $9i$ from the digital-analog converter $10p$ may be fed to a cathode ray tube or the like for display in the manner shown in FIG. 3.

Figure 7:
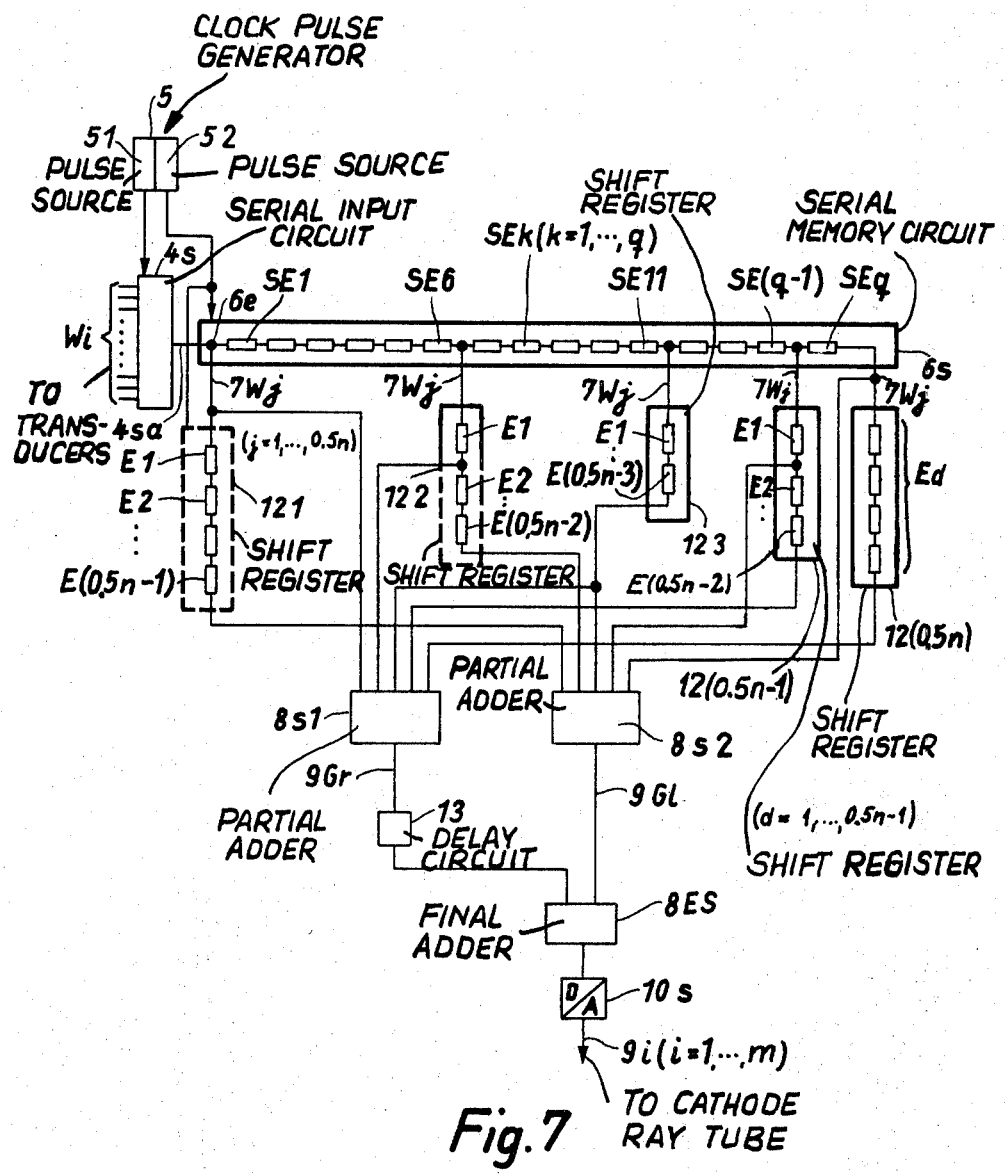
FIG. 7 is a block circuit diagram illustrating a variation of the embodiment shown in FIG. 5 involving the simultaneous addition of the partial signals.

In order to reduce the number of connections $7W2j$, shown in FIG. 6, a variation of the circuit arrangement of FIG. 5 can be used with advantage. Such a circuit arrangement is shown in FIG. 7. A memory circuit $6s$ is provided for the serial coding of the received signals into $z$ serial bits. The serial memory circuit $6s$ includes $q$ series-connected memory units SEk, each memory unit SEk having $m$ memory locations SP and each memory location SP having $z$ memory cells. Each memory unit SEk has, in contradistinction to the previously described embodiments, only a single output provided from its end, i.e. from its last memory cell. The output from the last memory unit SEq corresponds to the time delay $tl$, i.e., when a received signal reaches this output upon having pushed in steps through serial memory circuit $6s$, time $tl$ will just have expired since the signal was fed to the read-in point $6e$. The output of the penultimate memory unit SE $(q-1)$ corresponds to the time delay $t2$ with respect to the read-in point $6e$ (see FIG. 2) and so on, the input of the first memory unit SE1 corresponding to the time delay $t(0.5n)$ as shown in FIG. 2. In the circuit arrangement according to FIG. 7 the delayed received signals from the transducers $Wi$ (FIG. 1) are thus no longer taken from the memory locations SP within each memory unit SEk, but rather they are obtained at the output of a memory unit SEk. Thus the expenditures for the needed output circuit, corresponding to the connections $7W2$, shown in FIG. 6, are reduced from n connections $7W2j$ to one half, i.e. $0.5\,n$ connections $7Wj$.

If the serial input circuit $4s$ has again switched through a received signal from the transducer W1 (FIG. 1) after one interrogation cycle period, at this moment the received signal from the transducer W1 will also be present at each respective output of each memory unit SEk, as derived from interrogation times during previous interrogation cycle periods, the received signal from the transducer W1 present at the output of the last memory unit SEq being the one received by the transducer W1 before time $tl$. After the step time $\tau$ the received signal from the transducer W2 which was received before time $t2$ is then present at the output of the penultimate memory unit SE $(q-1)$. Again after the step time $\tau$ the output of the memory unit SE11 provides, as the best approximation of the required time delay $t3$ (see FIG 2), that the received signal from the transducer W3 which was received by the transducer W3 before about time $t3$, and so forth so that the received signals from all the transducers $Wj$ (FIG. 1) can be obtained at the memory units SEk corresponding to the time delays $tv$.

The step time $\tau$ lies between each of the individual received signals with the correct time delay, which signals are to be summed to a partial signal $9Gr$ or $9Gl$, respectively, In order to effect simultaneous addition of the individual, consecutively arriving accurately delayed received signals from transducers $Wj$, for example of half group Gr, the outputs of the memory units SEk, in the given example the memory units SE6, SE11, SE$(q-1)$, SEq, and the read-in point $6e$ of serial memory circuit $6s$ are connected to shift registers, $12j,j$ being equal to $1, \ldots, 0.5n$, whose storage times differ by exactly the step time $\tau$. The last shift register $12(0.5n)$, which has the longest storage time, is connected with the last memory unit SEq and stores the received signal with the time delay $tl$ until the last one of the transducers $Wj$ of the first half group Gr is being scanned and its received signal appears at the read-in point $6e$ of the serial memory circuit $6s$. The longest storage time is thus equal to the half group time $0.5n$ τ minus the step time, i.e. $(0.5n - 1)τ$. This longest storage time is realized in the longest shift register $12(0.5n)$ by $(0.5n - 1)$ memory cell units E$d$, $d$ being equal to $1, 2, \ldots, (0.5n - 1)$ and a shift rate. With serial coding, each memory cell unit E$d$ of the shift register $12(0.5n)$ contains $z$ memory cells and the shift rate is equal to the storing clock pulse rate $z \cdot Pr$, the clock pulses being supplied from the clock pulse generator 5.

The shift register 12 $(0.5n - 1)$ is connected with the penultimate memory unit SE$(q - 1)$ and consists of $(0.5n - 2)$ memory cell units E1, E2, $\ldots$, E $(0.5n - 2)$. Its adjacent shift register 123, in this example, has only two memory cell units E1, E$(0.5n - 3)$ and its adjacent shift register 122 for forming the first partial signal 9G$r$ has only one unit E1. The outputs of shift registers 122, 123, 12.0$5n$ and the read-in point 6$e$ are connected with a partial serial adder 8$sl$. After the half group time $0.5nτ$ minus the step time $τ$, i.e. after time $(0.5n - 1)τ$, the time delayed received signals from the $0.5n$ transducers W$j$ of the half group G$r$ appear simultaneously at the shift registers 12$j$ to form the first partial signal 9G$r$ in the partial serial adder 8$sl$.

After scanning of transducer W$(0.5n)$ the momentary received signal from the transducer W$(m - 0.5n)$ appears at the output of the input circuit 4$s$ after a cycle period T minus the half group time $0.5nτ$, which momentary signal serves as the first received signal of the second half group G1 of the transducers W$j$, $j$ being equal to $(m - 0.5n), \ldots m$ for forming the second partial signal 9G1. At this scanning time all outputs of the memory units SE$k$ have the received signals from the transducer W$(m - 0.5n)$ originating from the different scanning times of preceding interrogation cycle periods. To form the second partial signal 9G1, the received signal present at the read-in point 6$e$ of the serial memory 6$s$ is required. Since, however, the transducer W$m$ is reached in the scanning sequence only after the half group time $0.5nτ$ minus the step time, this received signal must be stored in the shift register 121, for the half group time $0.5nτ$ minus the step time $τ$. The shift register 121 therefore consists of $(0.5n - 1)$ memory cell units E$d$ as does the last shift register $12(0.5n)$ which stores the received signal from the transducer W1 at the output of the last memory unit SE$q$ for the same period of time to form the first partial signal 9G$r$. After step time $τ$ the momentarily interrogated received signal from transducer W$(m - 0.5n+ 1)$ appears at the read-in point 6$e$ of the series memory circuit 6$s$ and received signals from this transducer W$(m - 0.5n+ 1)$ from preceding interrogation cycles appear at the outputs of all memory units SE$k$. At the output from the memory units SE6 this received signal is taken off since it requires the time delay $t4$ for forming the second partial signal 9G1 (see FIG. 2) and is stored in the shift register 122 for a time equal to the half group time $0.5nτ$ minus the double step time $τ$. In order to conserve circuit elements, the storing time $(0.5n - 2)τ$ which is now required at the output of the memory unit SE6 is realized by an extension of the already present shift register 122 with only one memory cell unit E1 so that it now contains a total of $0.5n - 2$ memory cell units E$d$, $d$ being equal to $1, 2, \ldots, (0.5n - 2)$, and thus effects the storage time $(0.5n - 2)τ$.

Again after the step time $τ$ the received signal from the transducer W$(m-2)$ appears at the output from the memory unit SE11 and is stored for one storing time which is equal to the half group time $0.5nτ$ minus the triple step time $τ$, in the shift register 123. In this advantageous variation of the circuit arrangement of the present invention no additional circuitry is required for the storing of this received signal for the simultaneous addition of the received signals with the correct time delay of the $0.5n$ transducers W$j$ of the second half group G1, since the shift register 123 already has the required number of memory cell units E$d$, $d$ being equal to $1, \ldots, (0.5m - 3)$. The received signal from the transducer W$(m - 1)$, which is required for the second partial signal 9G1 behind memory unit SE$(q - 1)$, need be delayed by only one memory cell unit E1 for the addition and can therefore be taken from the already present shift register $12(0.5m - 1)$ behind its first memory cell unit E1. Again after the step time $τ$ there then appears at the output of the last memory unit SE $q$ the received signal of the transducer W$m$ with the time delay $tl$ which is the last one required for forming the second partial signal 9G1 for the group signal 9$i$ of the group characteristic pointing in direction R$i$. Thus the output of the last memory unit SE$q$ is connected directly with one partial series adder 8$s2$ which forms the second partial signal 9G1.

After the first partial signal 9G$r$ is formed, a time expires which is equal to the cycle period T minus the half group time $0.5nτ$, until the second partial signal 9G1 for the same group signal 9$i$ appears at the output of the second partial adder 8$s2$.

The first partial signal 9G$r$ is thus stored for the cycle time T minus the half group time $0.5nτ$ in a delay circuit 13 and then added to the second partial signal 9G1 in a final adder 8ES. The final adder 8ES is connected to a digital-analog converter 10$s$ at whose output appears the group signal 9$i$, as the sum of the two partial signals 9G$r$ and 9G1. In the spacing of the step time $τ$ there appear the group signals 91, 92, $\ldots$, 9$m$ of the adjacent group characteristics in the direction of rotation 3, as shown in FIG. 1. The group signals 9$i$ from the digital-analog converter 10$s$ may be fed to a cathode ray tube or the like for display in the manner shown in FIG. 3.

The advantage of the variation of the present invention shown in FIG. 7 is that the individual correctly delayed received signals of a half group G$r$ or G1, respectively, from $0.5n$ transducers W$j$ are taken off only at the end of the memory units SE$k$ of the serial memory circuit 6$s$, so that the serial memory circuit 6$s$ requires only shift registers of the same length with only a single output from their respective last memory cells, which shift registers are inexpensive and take up very little space.

When the received signals are coded into $z$ parallel bits as in the circuit arrangement as illustrated in FIG. 6, the circuit arrangement of FIG. 7 may be modified to accommodate the new code in that a parallel input circuit 4$p$ with the parallel memory circuit 6$p$ connected thereto are provided and the shift registers 12$j$ are arranged exactly $z$ times in parallel, one memory cell unit E consisting only of one memory cell. The shift registers 12$j$ are supplied with clock pulses at the clock pulse repetition rate P$r$ from the source 51 of the clock pulse generator 5 in the same manner as the parallel memory circuit 6$p$ shown in FIG. 6. The partial serial adders 8$s1$ and 8$s2$ are each, in this case, replaced by respective binary partial parallel adders, and the delay circuit 13, in this case, is realized by $z$ parallel shift registers which each have the number of memory cells ($m-0.5n$). Due to the obvious equivalence, the circuit arrangement of FIG. 7 is not again shown, in modified form, for the case of coding annd processing using $z$ parallel bits.

Figure 8:
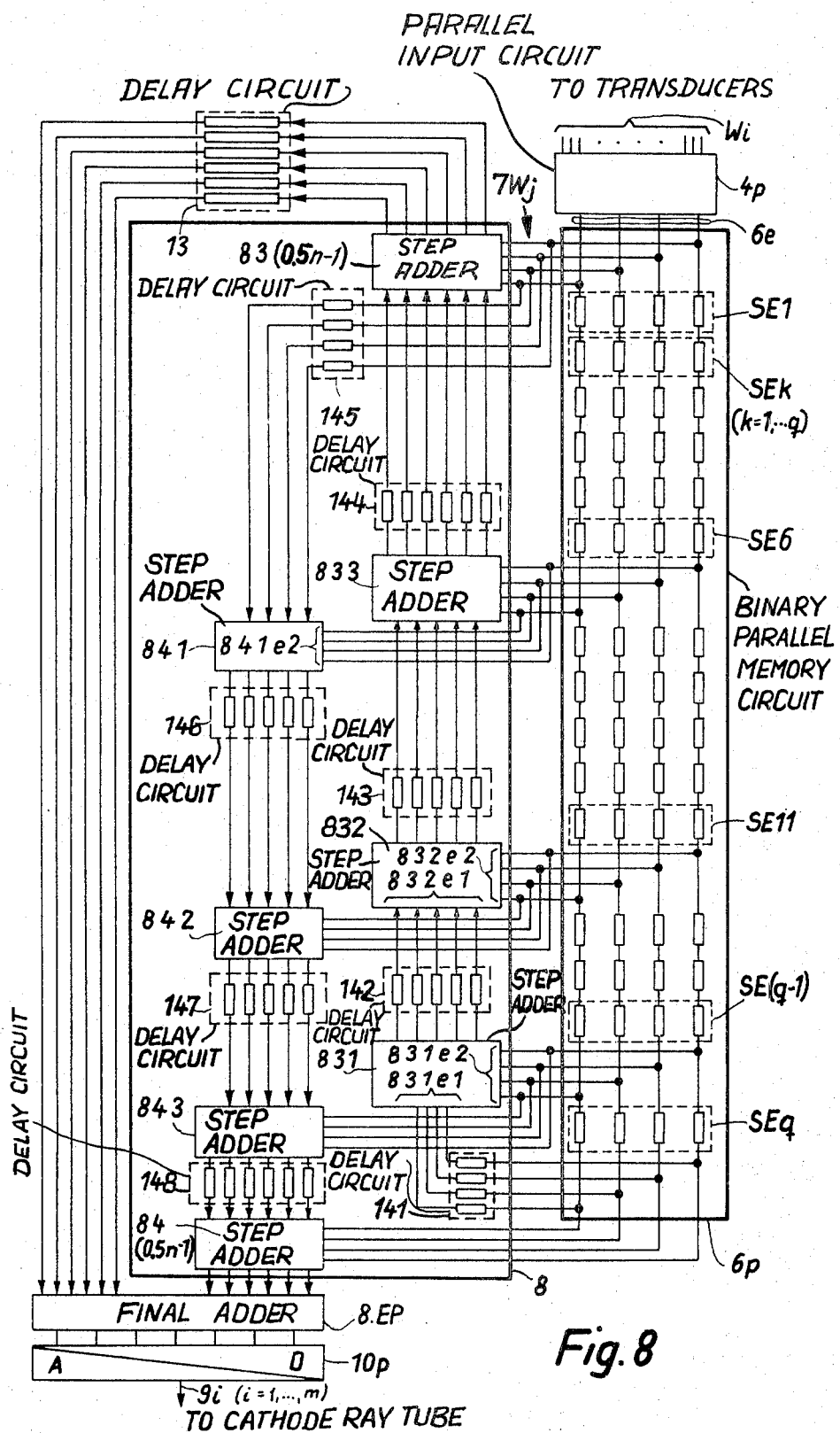
FIG. 8 is a block circuit diagram illustrating a variation of the embodiment shown in FIG. 6 involving the step-wise addition of the two partial signals.

FIG. 8 illustrates a further development of the present invention for forming two partial signals 9Gr, 9Gl and a group signal 9i by step-wise adding of the delayed received signals in the modified adding circuit 8 for the case of coding the received signals into $z$ parallel bits. The adding circuit 8, of the circuit arrangement shown in FIG. 8, consists of ($0.5n-1$) partial step adders 83d, d being equal to 1, 2, ... ($0.5n-1$), and 84d, d being equal to 1, ... ($0.5n-1$) for each partial signal 9Gr, 9Gl and a parallel final adder 8EP. The last memory unit SEq of a binary parallel memory circuit 6p is connected, via a first delay member 141 with a delay time which is equal to the step time $\tau$, with one input 831e1 of a partial step adder 831 which is connected with its other input 831e2 with the outputs of the memory unit SEk having the second longest time delay, i.e., in the cited example with the penultimate memory unit SE($q-1$) for a time delay $t2$. The delay member 141 is provided so that the received signal of the transducer W($i+1$) which is adjacent to the transducer Wi, and which appears only after the step time $\tau$ in the penultimate memory unit SE($q-1$) can be added with the time delay $t2$ in the proper time relationship to the received signal of the preceding transducer Wi. The outputs of the partial step adder 831 are connected, via an identical delay member 142, with the inputs 832e1 of a partial step adder 832 of the same construction whose second inputs 832e2 are connected with the outputs from the memory unit SE11, which furnishes the received signal of the next adjacent transducer W($i+2$) with the correct time delay. The following partial step adders 833 to 83($0.5n-1$) are wired in the same manner, with respective delay members 143 and 144 positioned in the path of first inputs so that the consecutively interrogated received signals from a partial signal 9Gr are added in steps in the proper time relationship. At the output of the partial step adder 83($0.5n-1$) appear the partial signals 9Gri for the half group Gr of transducers Wj (FIG. 1) which lie in the direction of rotation indicated by the arrowheaded line 3 (FIG. 1) with respect to the direction Ri of the group characteristic.

After a cycle period T minus twice the half group time $n\tau$, since the onset for the formation of the first partial signal 9Gr, there appears at a read-in point 6e to the parallel memory circuit 6p the received signal from that transducer Wj which lies closest to the reference line Rri, as shown in FIG. 1, with the correct time delay; for the reference line Rrl it is the transducer W($m-0,5n$). This received signal is fed, via a delay member 145, to a partial step adder 841 whose second inputs 841e2 are connected with a memory unit SEk corresponding to the next longer time delay $tj$, in this example the memory unit SE6 for time $t4$, as illustrated in FIG. 2. Again after step time $\tau$ there appears at the next output of the parallel memory circuit 6p, i.e., from the memory unit Se11, the received signal of the next adjacent transducer W($m-3$) in direction of rotation indicated by the arrow-headed line 3 (FIG. 1) with the correct time delay, which signal is added to the result of the previous addition in a partial step adder 842, which receives its second inputs from the partial step adder 841 via a delay member 146. The partial step adder 842 is connected, via a further delay member 147, to a further partial step adder 843 which itself is also connected with the next adjacent output SE($q-1$) from the parallel memory circuit 6p. The last partial step adder 84($0.5n-1$) is connected firstly with the outputs from the partial step adder 842, via an additional delay member 148, and secondly with the outputs from the last memory unit SEq of the parallel memory circuit 6p and furnishes at its output the partial signals 9Gl1i for the half group G1 of transducers Wj, which lie opposite the direction of rotation indicated by the arrow-headed line 3 (FIG. 1) with respect to the direction Ri of the group characteristic.

Since between the formation of the first partial signal 9Gr and the second partial signal 9Gl of the group signal 9i there always expires the cycle time T minus the half group time $0.5n\tau$, the first partial signal 9Gr is delayed through shift registers, shown as a delay circuit 13, whose number of memory cells is ($m-0.5n$). The shift registers of the delay circuit 13, and the other delay circuits as well, are advantageously composed of memory flip-flops all connected with a source of pulses which supplies pulses at a clock pulse repetition rate Pr so that all circuit elements which determine delays are operated in synchronism. The clock pulse generator which, for the sake of simplicity, is not shown in FIG. 8 may be constructed as is the clock pulse generator 5 shown, for example, in FIG. 3 and FIG. 4.

The final adder 8EP is connected to a digital-analog converter 10p at whose output the group signals 9i appear consecutively at time intervals of step time $\tau$. The group signals 9i from the digital-analog converter 10p may be fed to a cathode ray tube or the like for display.

Figure 9:
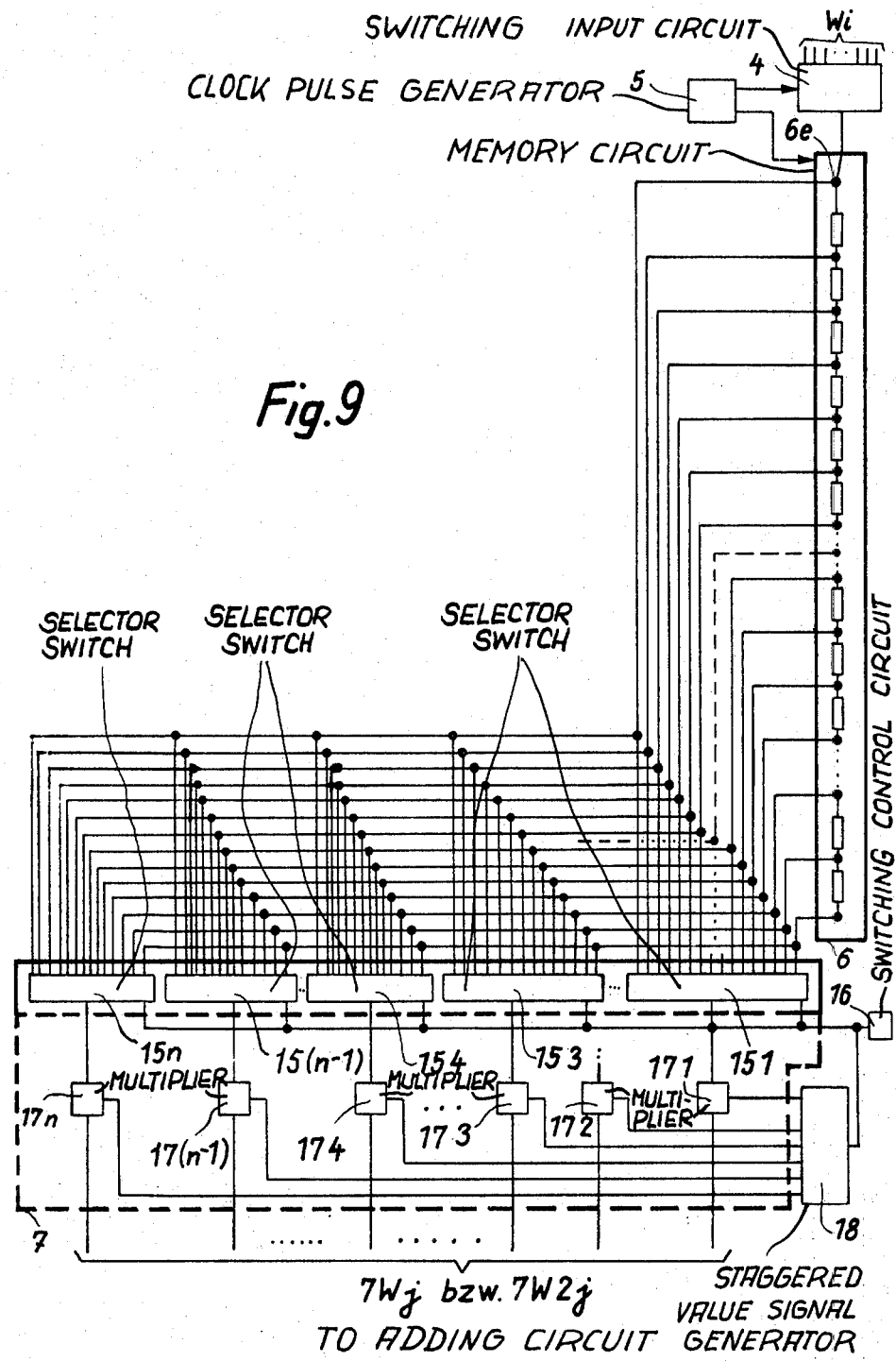
FIG. 9 is a block circuit diagram of a further modification of the block circuit diagram shown in FIG. 3 which is particularly adapted for different receiving systems having different arrangements of the transducers.

FIG. 9 shows a further embodiment of the circuit arrangement according to the present invention for receiving systems having different geometrical arrangements of the transducers Wi. While FIG. 2 illustrates the realizable time delays $tv$ in dependence on the required time delays $tj$ for a circular arrangement of $m$ transducers Wi, according to which fixed connections 7W2j were provided as an output circuit 7, as shown in FIGS. 4 to 8, the circuit arrangement according to FIG. 9 solves the problem of an adaptation to the time delays $tj$ belonging to the different geometrical arrangements of the transducers Wi in that the outputs not only of certain memory units, but of all memory units SEk ($k = 1, \ldots, q$) of the memory circuit 6 are brought out and connected with inputs of a maximum of n selector switches 152j, 2j being equal to $1, 2, \ldots, n$, serving as the output circuit 7. A maximum number of n selector switches 151 ...., 15n are used if $n$ transducers W2j are to be used to form a group characteristic, each selector switch 152j of the selector switches 151 ...., 15n having so many inputs as the memory circuit 6 has memory units SEk. The selector switches 152j can be controlled by a switching control circuit 16 in such a manner that only a single input of each selector switch 152j is switched to its sole output. According to the geometric arrangement of the transducers Wi of a momentarily employed receiving system the output of the selector switch 151 is connected, via one of its inputs, with that memory unit SEk which corresponds to the longest required time delay $tj$; the output of the selector switch 152 is connected, via one of its inputs, with that memory unit SEk which corresponds to the second longest required time delay $tj$. All other selector switches 152j are set accordingly by the switching control circuit 16, control circuit 16 being preprogrammed for the geometric arrangements of receiving systems which can be encountered.

It is known to influence the degree of bundling of group characteristics by amplitude evaluation of the received signals in that staggered values which are adapted to the geometry of the arrangement of the transducers W$i$ are multiplied with the time delayed received signals. In this circuit arrangement, according to the present invention, such evaluation can be advantageously realized in that the received signals with the correct time delay are multiplied, within the output circuit 7 at the outputs of the selector switches 152$j$ by individual staggering values. When the time delays $tj$ for the different geometric arrangements of transducers W$i$ are switched, the staggering values must also be changed. Each output from the selector switches 152$j$ is then connected for this purpose with multiplying circuits 172$j$, 2$j$ being equal to $1, \ldots, n$, as shown in FIG. 9 whose second inputs are connected together with a staggering value generator circuit 18 for different staggering values given in accordance with the geometric arrangement of the transducers. The outputs of the individual multiplying circuits 172$j$ correspond to the outputs of the output circuit 7 of FIGS. 4 to 8, the output from the multiplying circuit 171 corresponding to the connection 7W1, the output of multiplying mechanism 172 corresponding to the connection 7W2, etc. To form two partial signals 9G$r$, 9G$l$, as shown for example in FIG. 7 or 8, only $0.5n$ selector switches 15$j$, $j$ being equal to $1, \ldots 0.5n$, and multiplying circuits 17$j$, $j$ being equal to $1, \ldots, 0.5n$, are required whose outputs then correspond to the connections 7W1/7W$m$ and 7W2/7W($m-1$), ..., 7W 0.5$n$/7W($m-0.5n$). The switching control circuit 16 is controllably connected to the staggering value generator 18 and effects switching of the staggering values from the staggering value generator according to a given program.

Figure 10:
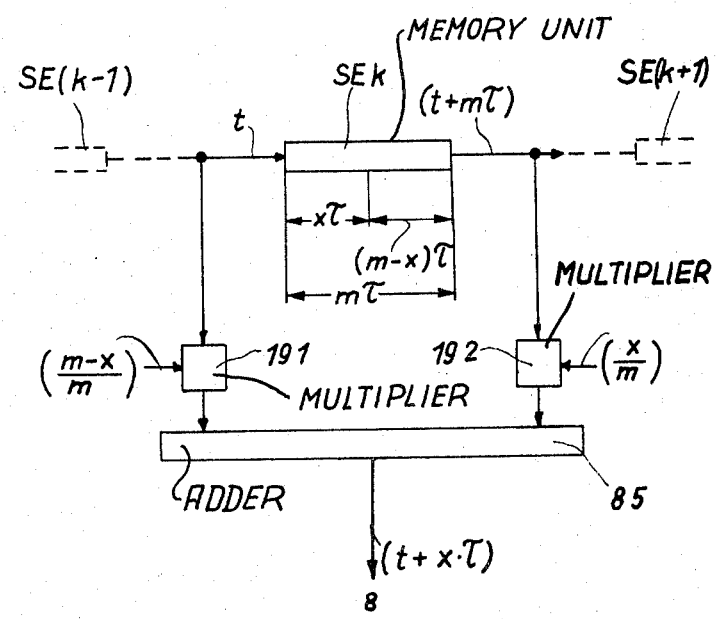
FIG. 10 is a block circuit diagram which illustrates, in principle, a circuit for approximating an intermediate value between two adjacent quantized time delays.

For the above-mentioned wiring reasons it may be appropriate to provide as few outputs as possible for the memory circuit 6 which however makes the quantization of the time delay units correspondingly coarse. To improve the approximation to the required time delays $tj$, for example of FIG. 2, a further embodiment of the present invention provides an approximation circuit. FIG. 10 shows such an approximation circuit which serves to provide the approximation of a desired time delay $tj = t + x\tau$. Time $x\tau$ lies within a timely quantized delay unit, i.e., cycle period $T = m\tau$, which is given by the input and output of a memory unit SE$k$. The input of a memory unit SE$k$ has a received signal with a time delay $t$ which is less than the desired delay. The output of memory unit SE$k$ has a received signal which is shifted by the cycle period $T = m\tau$ with respect thereto, whose time delay $t + m\tau$ is longer than the desired delay. The desired time dealy $tj = t + x\tau$ lies between the input and output of the memory unit SE$k$. Only the input and output of memory unit SE$k$ are accessible and are each connected with a respective multiplier 191 and 192.

If the memory unit SE$k$ is part of an analog memory circuit, the multiplier 191 receives a multiplicand in the form of an analog value $(m-x)/m$, its value being determined by the longer time delay $(t + m\tau)$ minus the desired time delay $tj = t + x\tau$ with reference to the cycle period $T = m \cdot \tau$. The multiplier 192 receives an analog value $(x/m)$ which is equal to the desired time delay $tj = t + x\tau$ minus the shorter time delay $t$ with reference to the cycle period $T = m \cdot \tau$. When a digital memory is used which is fed with received signals coded in $z$ serial bits, the multipliers 191 and 192 operate serially binary, their multiplicands being fed in series as binary values. When parallel binary coded received signals are used, the multipliers 191 and 192 as well as their multiplicands are designed accordingly.

The respective outputs of the multipliers 191 and 192 are connected to an adder 85 which is adapted in its construction so that at its output the signal with the desired time delay $tj = t + x\tau$ can be obtained. With the aid of the usual exponential expression for the consideration of parameters changing in time, it can be shown that at least for sufficiently low received frequencies a good approximation to the desired time delays $tj$ can be obtained with the aid of the approximation circuit as shown in FIG. 10.

Figure 11:
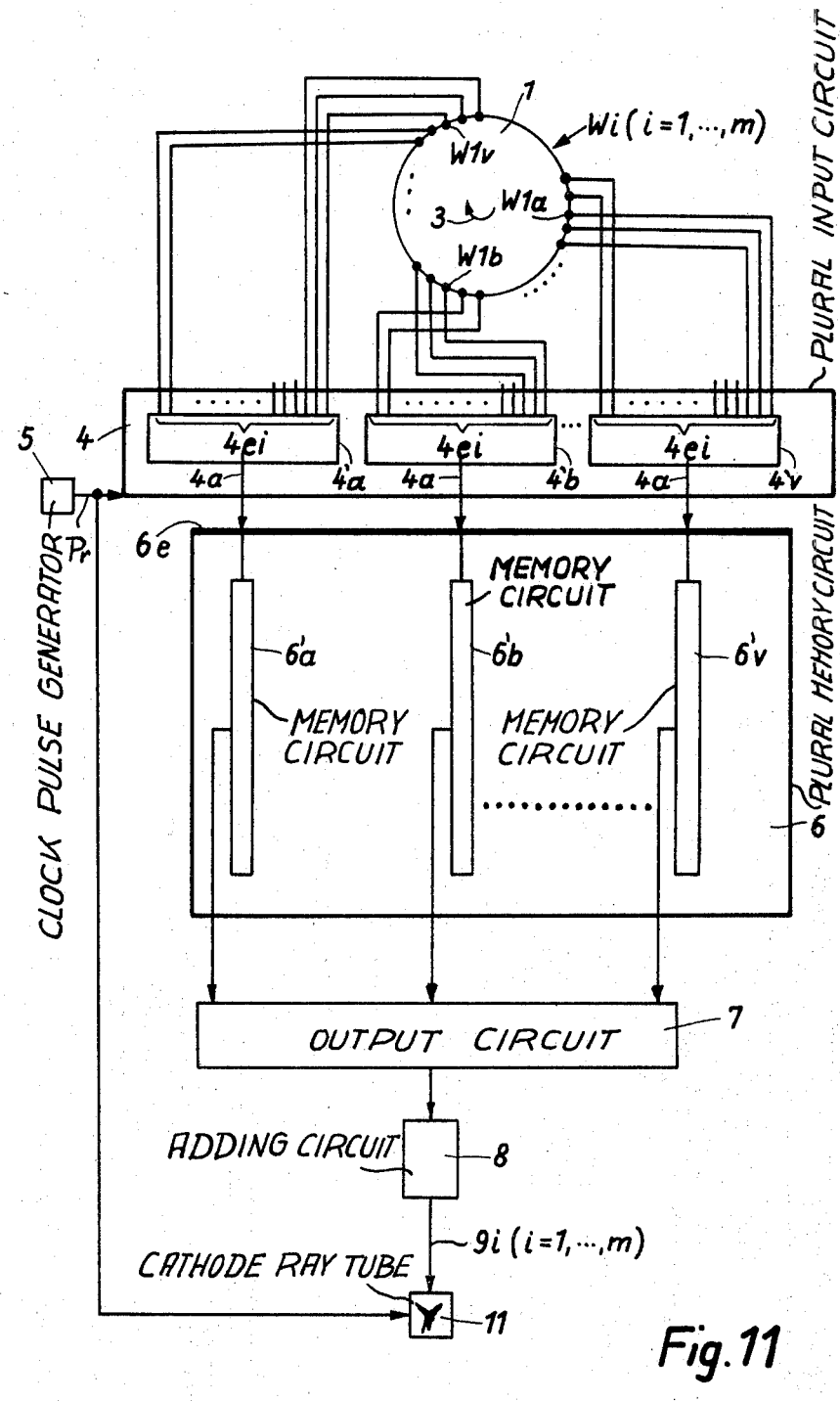
FIG. 11 is a block circuit diagram of a further circuit arrangement according to the present invention particularly useful for received signals of very high repetition rates or frequencies.

On the other hand, finer quantization of the cycle period T than of the quantized time delay unit $T = m/Pr$ is also possible in that the clock pulse repetition rate P$r$ is increased. At the present-day state of the integrated circuit art, however, arbitrarily increasing the clock pulse repetition rate is not possible, since the scanner in the form of the multiplexer must switch through a succession of different analog received signals from two adjacent transducers W$i$ within one step time $\tau$ which is equal to the reciprocal value of the clock pulse repetition rate P$r$, which requires more time than switching through binary values. A decrease in the cycle period T can be realized, however, according to an additional preferred feature of the present invention in that, as shown in FIG. 11, the input circuit and the memory circuit of a circuit arrangement according to the present invention are provided other than singly, i.e., in respective pluralities. With a quantized time delay unit of $T' = \tau m/v$ which can be realized, $v$ input circuits 4'$a$, 4'$b$, ... 4'$v$ and $v$ memory circuits 6'$a$, 6'$b$, ... 6'$v$ are employed as shown in FIG. 11. The scanners in the $v$ input circuits 4'$a$, 4'$b$, ... 4'$v$ are so controlled that the $m$ transducers W$i$, $i$ being equal to $1, \ldots, m$, are scanned in the same sequence but offset by the same number of transducers $m/v$ at the clock pulse repetition rate P$r$ by clock pulses supplied from a clock pulse generator 5. When the input circuits 4'$a$ switches through the received signal from the transducer W1$a$, the scanner of the input circuit 4'$b$ is simultaneously in engagement with the transducer W1$b$ which is disposed $m/v$ transducers W$i$ away from the transducer W1$a$ in the direction of rotation indicated by the arrow-headed line 3, and the scanner of the input circuit 4'$v$ is in engagement with the transducer W1$v$, which is also removed from the transducer W1$a$ by $m/v$ transducers W$i$, but in the direction opposite to the direction of rotation as indicated by the arrow-headed line 3. With the same clock pulse repetition rate the delayed received signals can thus be obtained from the subsequently connected memories 6'$a$, 6'$b$, ... 6'$v$ in fixed steps for the quantized time delay period $T' = m/vPr$ and with only a single output circuit 7 to which is connected an adding circuit 8. Another great advantage lies in the multiple use of the input circuit 4, with a memory circuit 6 having the memories 6' thereof, connected to parts of the input circuit 4 in that impinging signals with higher received frequencies can be evaluated since the individual transducers W$i$ are again interrogated after the cycle period T divided by $v$, i.e., after the period T'

= $T/v$, i.e. with a v-fold clock pulse repetition rate. The maximum received frequency which can be evaluated now lies $v$ times higher than before.

The added expense resulting from the inclusion of a plurality of input cicuits 4' with associated memories 6' connected thereto is of particular advantage when received frequencies of impinging signals are to be evaluated which lie so high that the technically limited processing times of the scanning input circuit as well as of digital-analog converters are higher than the step time $\tau$ between two sequential interrogating times required for the evaluation of such high received frequencies which interrogating times are always equal to the reciprocal value of the clock pulse repetition rate for the control of such a circuit arrangement.

The group signals from the output of the adding circuit 8, as shown in FIG. 11, are fed to a cathode ray tube 11, whose time deflection in the direction of rotation indicated by the arrow-headed line 3 is effected by clock pulses supplied from the clock pulse generator 5 at the clock pulse repetition rate $Pr$.

Figure 12:
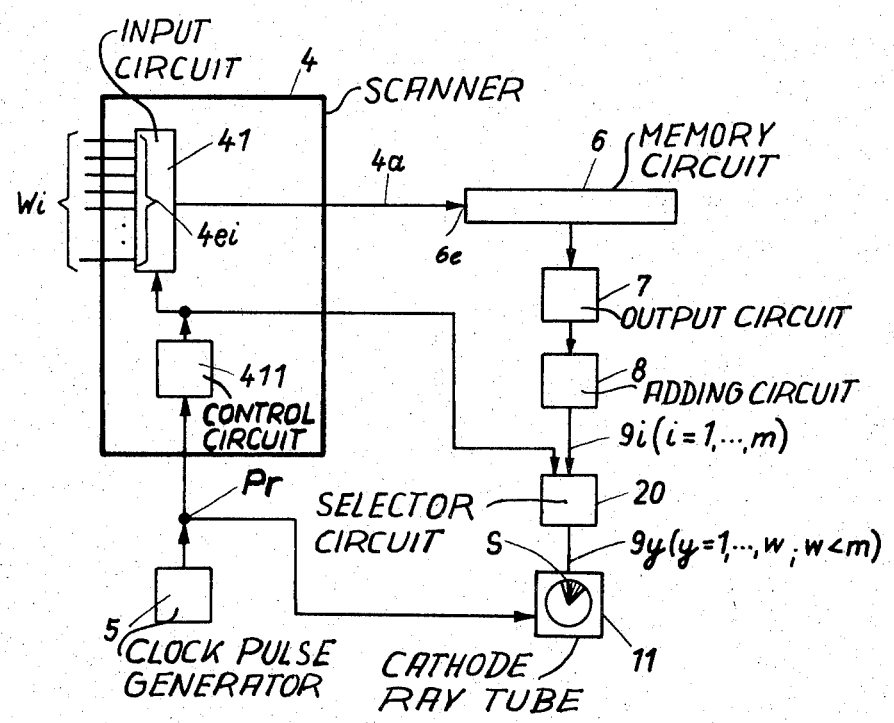
FIG. 12 is a block circuit diagram of a further circuit arrangement according to the present invention involving modification of the circuit arrangement shown in FIG. 3, in which indication of a portion of the group signals as a sector is possible.

According to a further preferred feature of the present invention, as shown in FIG. 12, it is also possible to display only a certain sector S, i.e. only a certain part of the group signals $9i$, on a cathode ray tube 11, namely, for example, only the group signals $9Y$, $Y$ being equal to $1, 2, \ldots, w$, of group characteristics pointing in the directions $Ry$, $y$ again being equal to $1, 2, \ldots, w$, where $w$ is less than $m$ (see FIG. 1). For this purpose, as shown in FIG. 12, a selector circuit 20 receives all consecutively produced group signals $9i$, $i$ being equal to $1, \ldots, m$, whose second input is connected with the output of a control circuit 411 which forms a part of the imput circuit 4. The selector circuit 20 switches only those group signals $9i$ to its output which belong to group characteristics of the directions $Ry$, $y$ being equal to $1 \ldots, W$. All other group signals $9(i - y)$ do not appear at the output of selector circuit 20 which is connected to the cathode ray tube 11. The cathode ray tube 11 displays only those group signals $9y$ which lie within the sector S. Again the illuminated length of the indicator corresponds to the intensity and its position within sector S to the direction $Ry$ of the impinging signals.

It should also be mentioned that the circuit arrangement according to the present invention, as shown in FIG. 12, is also suited, if desired and modified, for transmitting rather than receiving signals. In such case, those memory units $SEk$ of the memory 6 which correspond to the time delays $tj$ receive a possibly digital transmitted signal and the end of the memory 6 is connected, if required via an analog-digital converter or converters, respectively, with the scanning circuit 4 whose inputs $4ei$, $i$ being equal to $1, \ldots, m$, are connected together, via amplifiers having lowpass behavior, with the transducers $Wi$ which in such an arrangement are used for transmitting. The control circuit 411 controls the scanner 41 according to the given program so that the transmitted signal is broadcast according to the group characteristics effected by the time delays $tj$. A change in the program of the control circuit 411 provides the possibility of transmitting only a selected number of the directions $Ri$, e.g. directions $Ry$, $y$ being equal to $1, \ldots, w$, and $w$ being less than $m$, so that only the sector S is covered with sound energy of adjacent group characteristics.

Figure 13:
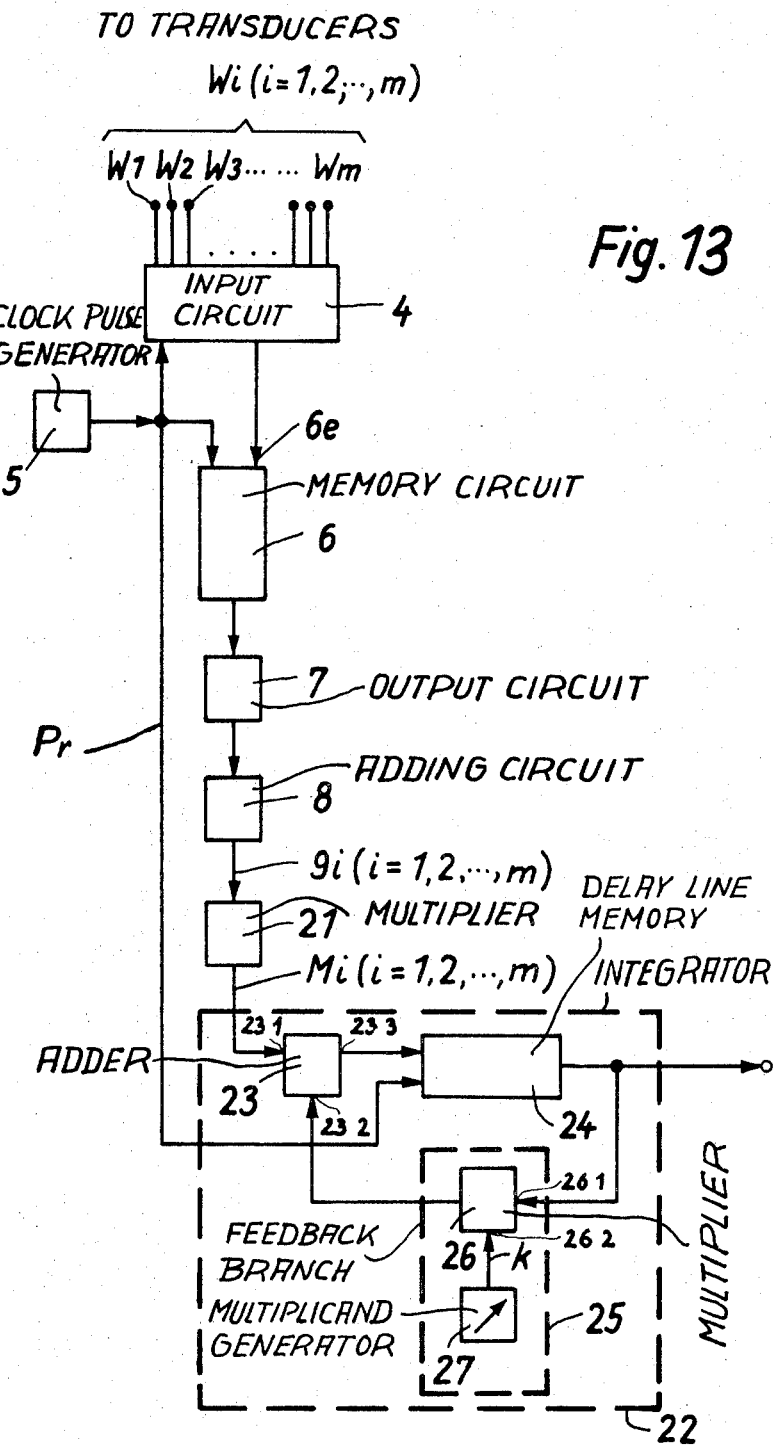
FIG. 13 is a block circuit diagram according to a preferred embodiment of the present invention for forming and processing group signals.

FIG. 13 is a block circuit diagram of a circuit arrangement for further processing group signals $9i$, a circuit arrangement for producing the group signals $9i$ also being shown. As shown in FIG. 13, an adding circuit 8 is connected to the circuit arrangement which also includes a scanning input circuit 4, a memory circuit 6, an output circuit 7 and a clock pulse generator 5 for processing signals from transducers $Wi$. The group signals $9i$, from the adding circuit 8, are fed before further evaluation to a multiplier 21 whose output is connected to an integrator 22. The integrator 22 consists of an adder 23 having one of its inputs arranged to receive the group signals $9i$ with a delay line memory 24 connected to its output 233 and a feedback branch 25 whose input is connected to the output of the delay line memory 24 and whose output is connected to a second input 232 of the adder 23. The delay line memory 24 has a plurality $m$ of memory locations which are equal to the plurality $m$ of the group characteristics and is controlled by clock pulses supplied from the clock pulse generator 5 at the clock pulse frequency $Pr$ so that a signal put thereinto appears at the output of the delay line memory 24 after one interrogation cycle, after a cycle period T. The feedback branch 25 consists of a multiplier 26 whose first input 261 is connected from the output of the delay line memory 24 and whose second input 262 is connected from a multiplicand generator 27. The output of the multiplier 26 is the output of the feedback branch 25. In the multiplicand generator 27 a multiplication value $k$ can be set whose value is always smaller by a certain deviation than the decimal value "1."

When the group signals $9i$ are processed in a manner which constitutes a quadratic rectification of the group signals $9i$, both inputs of the multiplier 21 are connected directly with the output of the adding circuit 8. After each cycle period T the squared group signal $(9i)^2$ belonging to one and the same group characteristic appears at the output of the multiplier 21 as the output signal $Mi$. One interrogation cycle later at time $tl$ the output signal $Mi(tl)$ is added in the adder 23 to a weighted squared group signal $k \cdot Mi(tl - T)$ originating from the same group characteristic; this weighted squared group signal $k \cdot Mi(tl - T)$ is produced because the momentary signal at the output of the delay line memory 24, i.e. the squared group signal $(9i)^2 (tl - T)$ from the preceding interrogation cycle is multiplied in the feedback branch 25 by the multiplication value $k$. The sum $Mi(tl) + k \cdot M\ i(tl - T)$ of these two signals is stored in the delay line memory 24 at the clock pulse repetition rate $Pr$, appears at its output after cycle period T and is again multiplied in multiplier 26 by the multiplication value $k$ and fed to the adder 23 via its second input 232. At this point in time $(tl + T)$ a new squared group signal $(9i)^2 (tl + T)$ is present at the first input 231 of the adder 23 as the output signal $Mi(tl + T)$ which again belongs to the same group characteristic. This output signal $Mi(tl + T)$ is added to the sum multiplied by the multiplication value $k$, i.e. $k \cdot Mi(tl) + k^2 \cdot Mi(tl - T)$ and stored in the delay line memory 24 for the cycle period T. After each cycle period T, for example at time $(tl + \alpha T + T)$, the preceding output signal $Mi(tl + \alpha T)$ plus the sum $k \cdot Mi(tl + \alpha T - T) + k^2 \cdot Mi(tl + \alpha T - 2T) + \ldots + k\alpha \cdot Mi(tl)$ of the weighted output signals $Mi$ from earlier interrogation cycles $\alpha T$, $\ldots \alpha T - T, \ldots, \alpha T - \alpha T$ appears at the output of the delay line memory 24 as the output from the integrator 22.

The processing of the group signal 9i thus takes place in such a manner that output signals Mi from multiplier 21 from long preceding interrogation cycles furnish a disappearingly small proportion for the momentary group signal being processed because of the repeated weighting with the multiplication value $k$, while the output signals Mi from multiplier 21 from the latter occurring interrogation cycles reach the output of the integrator less weakened and the newest output signal Mi is present as a full valued signal. If, for example, the present momentary value of all group signals from one group characteristic from all interrogation cycles is always identical and thus the output signal Mi from multiplier 21 is identical, there appears at the output of the integrator 22, after a sufficient number of interrogation cycles, a limit value of the processed group signals which is determined by the multiplication value $k$ and is equal to the output signal Mi divided by the deviation of the multiplication value $k$ from the decimal value "1." By varying the multiplication value $k$ this limit value can be varied.

The integrator 22 has an integration period which is dependent on the clock pulse repetition rate P$r$ with which the delay line memory 24 is operated and on the multiplication value $k$. The integration time results in that at a point in time t1 the input of the adder 23 is once charged with an output signal Mi. The integration time is assumed to have been expired, for purposes of definition, when at the output of the integrator the once applied output signal Mi has dropped at the input of the adder 23 to its value multiplied by the reciprocal value of the base of natural logarithms "e"; this is the case when a time has expired which is equal to the cycle time T divided by the deviation of the multiplication value $k$ from the decimal value "1."

It can be seen that the integration time depends, on the one hand, on the clock pulse repetition rate P$r$ and, on the other hand, on the multiplication value $k$. These dependencies are utilized in the circuit of the present invention in order to vary the integration period by changing the clock pulse repetition rate P$r$ and by varying the multiplication value $k$. When the clock pulse repetition rate P$r$ is varied to vary the integration time, the clock pulse repetition rate P$r$ is simultaneously varied for the interrogation of the m transducers W$i$. This is possible as long as the clock pulse repetition rate has not already been determined by the maximum or frequency of the wave energy to be received, otherwise it is of great advantage not to utilize the clock pulse repetition rate P$r$ for varying the integration period but rather the multiplication value $k$ because this value can be freely selected independently of the formation of the group signals 9i.

With the circuit arrangement according to the present invention it is thus possible with particular advantage, once the clock pulse repetition rate P$r$ has been optimally selected, without modification of the basic circuit for the time series formation of the group signals 9i, to select the integration period completely freely solely via the multiplication value $k$. For practical applicability of the circuit arrangement this may be of extraordinary importance, depending on the actual problems to be solved, for example, if the evaluation of the momentary values of the group signals 9i is to be effected with as little influence as possible from the past — this is the case when the integration period is short, i.e. the multiplication value $k$ is small — or if a representative average value is to be found under consideration of substantial influences from the past — this is the case when the integration period is selected to be long by setting a large multiplication value $k$.

Advantageous embodiments and more special applications and preferred modifications of the circuit arrangement of the present invention are shown in further figures.

Figure 14:
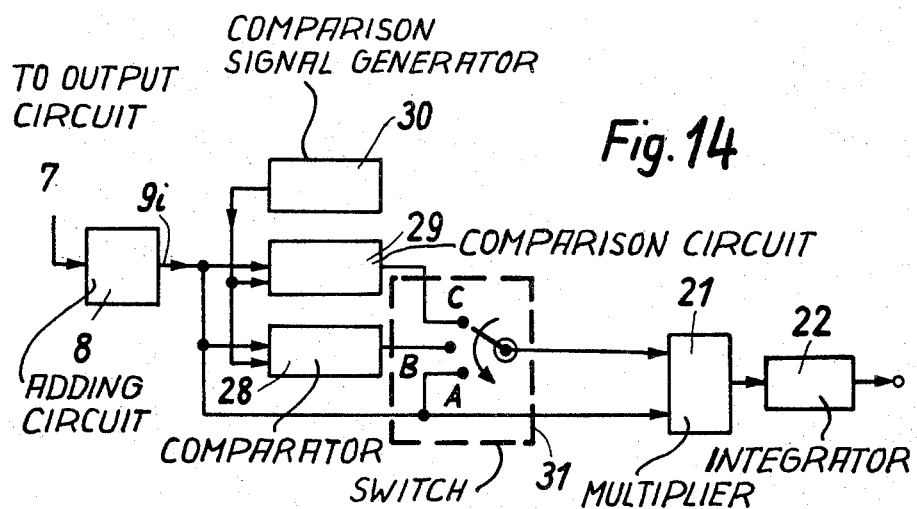
FIG. 14 is a block circuit diagram of a circuit arrangement for the selective processing of group signals according to a square, half wave or full wave rectification.

In FIG. 14 the group signals 9i from an adding circuit can be selectively evaluated with the aid of a switch 31 and a multiplier 21 having an integrator 22 connected thereto in a manner equivalent to a quadratic rectification, half wave rectification, or full wave rectification. For this purpose the output of the switch 31 is connected to one input of the multiplier 21, whose second input is connected from the adding circuit 8. Three contacts of the switch 31 are coupled respectively to the output of the adding circuit 8, a comparator 28 and a comparison circuit 29, which both are connected via their respective first inputs to the adding circuit 8.

At the output of the comparator 28, as well as at the output of the comparison circuit 29, there appears the value "+1" when any group signal 9i is positive compared to a comparison signal furnished by a comparison signal generator 30. The output signal at the comparator 28 has the value "0" when any group signal 9i is negative with respect to or exactly equal to the comparison signal. The output from the comparison circuit 29 has the value "−1" when any group signal 9i is negative with respect to the comparison signal or is equal to the comparison signal. At a position "A" of the switch 31 the group signals 9i are subjected to a quadratic rectification as already explained in connection with FIG. 13; at a position "B" of the switch 31 the signal processing taking place through the comparator 28 corresponds to a half-wave rectification; at a position "C" of switch 31 the signal processing occurring through comparison circuit 29 corresponds to full-wave rectification.

Figure 15:
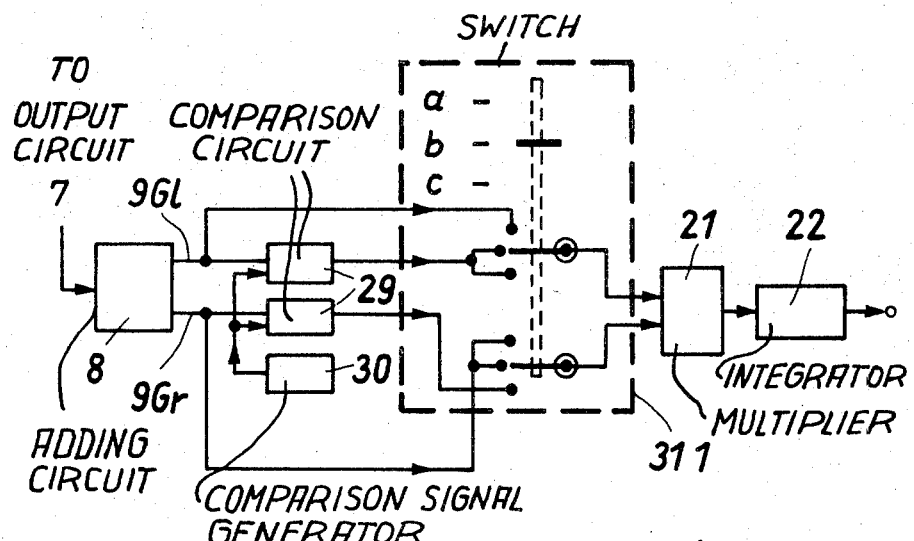
FIG. 15 is a block circuit diagram of a circuit arrangement for processing two partial signals of a group signal according to cross correlation, a so-called phase-controlled correlation and a polarity coincidence correlation.

It is also possible to obtain two partial signals 9G1, 9G$r$ of a group signal 9i at two outputs of an adding circuit 8, as hereinbefore described, and as illustrated broadly in FIG. 15. For the correlative processing of the two partial signals 9G1, 9G$r$ there again exist three possibilities, which can be selectively applied by switching the inputs of a multiplier 21 as shown in FIG. 15. The two outputs of the adding circuit 8 are each connected together with one of two comparison circuits 29 which are each connected with a comparison signal generator 30. The two inputs of the multiplier 21 are connected with two coupled switches 311. For a cross-correlation of the two partial signals 9G1, 9G$r$ the two switches 311 are brought into a switching position $a$, so that the two partial signals 9G$r$, 9G1 are multiplied in the multiplier 21 and are then integrated in an integrator 22. With a switch position $b$ the one input of the multiplier 21 is connected from the output of one of the two comparison circuits 29 and the second output with one of the two outputs of the adding circuit 8; this one of the outputs is not connected with the input of the above-mentioned comparison circuit 29. Since at the output of the comparison circuit 29 only the values "−7" or "+1," respectively, can appear, this type of processing is a so-called phase-controlled cross-correlation. In the switch position $c$ the outputs of the two comparison circuits 29 are connected with the respective two inputs of the multiplier 21. This type of processing is a so-called polarity coincidence correlation.

The circuit arrangement of the present invention as shown in FIGS. 13–15 can be realized and applied in analog as well as in digital techniques. In both techniques the basic circuits, such as the addition and multiplication circuits, are commercially available. The delay line memory in the analog technique may be a recording and playback device operating with a magnetic tape or a delay member of a high order and in the digital technique a shift register. The multiplicand generator 27 and the comparison signal generator 30 are an adjustable voltage source in the analog technique and a digital location indicator in the digital technique. Comparator and comparison circuits in the analog technique can be realized by appropriately wired up operational amplifiers and in the digital technique by logic gates.

In the case of realization of the circuit arrangement of the present invention using digital techniques there result particularly advisable combination possibilities for the individual interacting components and thus an advantageous low requirement for circuitry in spite of the many possible ways of application.

When the group signals $9i$ at the output of the adding circuit 8 are present in a parallel binary code, the multiplication value k is a binary sequence of digits which is so dimensioned that it differs from the decimal value "1" by a deviation $2^{-A}$ and thus is equal to the difference $(1-2^{-A})$. This multiplication value $k = (1-2^{-A})$ has a number of bit locations which is equal to A. The values of these bit locations in the binary sequence of digits of the multiplication value $k$ is $2^{-1}, 2^{-2}, \ldots, 2^{-A}$.

Figure 16:
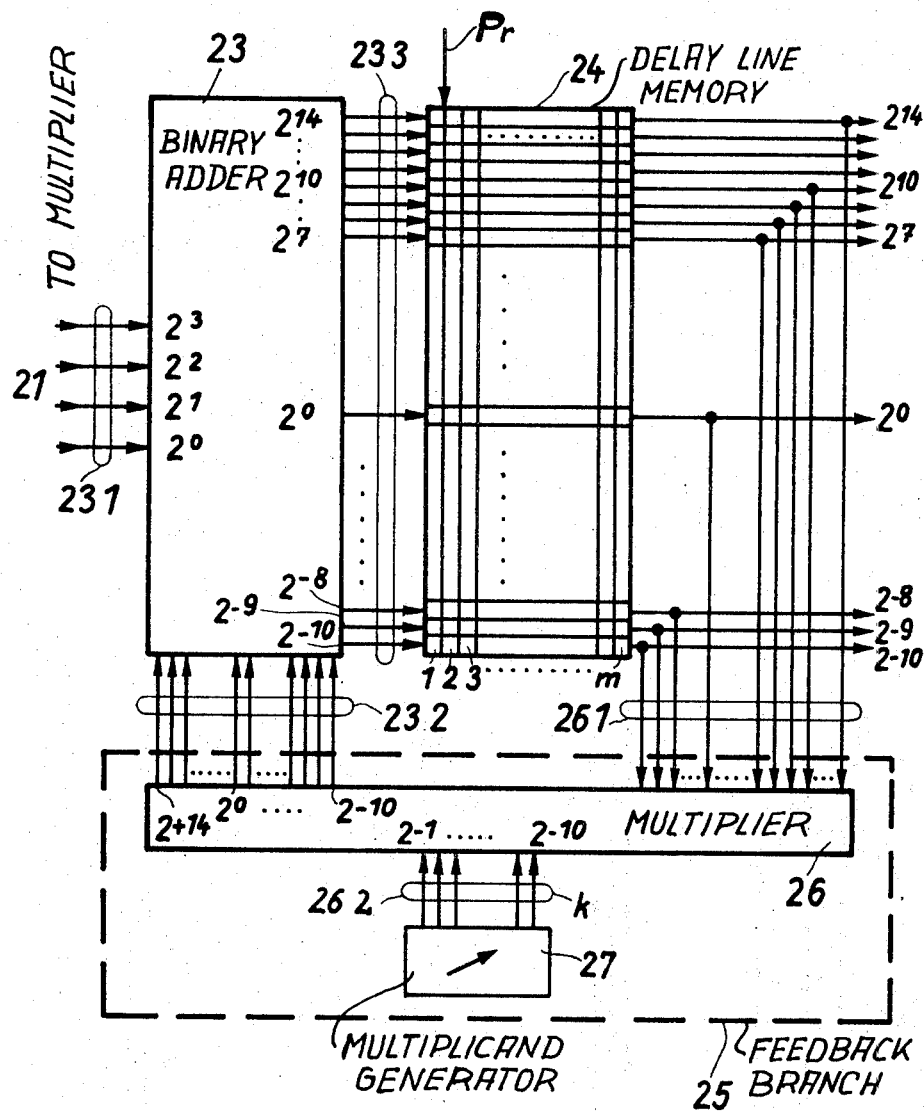
FIG. 16 is a block circuit diagram of an integrator for processing binary group signals.

As shown in FIG. 16, an integrator may include an adder 23, constructed as a binary adder. Its input bit locations at its first input 231 are dependent on the number of bits of the binary coded group signal $9i$. The bit locations at the output 233 of the adder 23 correspond with those at the output of the integrator 22 (FIG. 13) and are dependent on the input bit locations of the binary coded group signal $9i$ supplied to its input 231. The bit locations at the output 233 of the adder 23 coincide with those at the output of the integrator 22 and are dependent on the input bit locations at the first input 231 of the adder 23 and of the number A of bit locations of the binary bit sequence of the multiplication value $k$.

The number of bit locations required at the output 233 and the distribution of their values does not result from the sum of input bit locations at the first input 231 and the number A of bit locations of the multiplications value $k$ but from a limit value consideration for the case where all input bit locations have a switching state "log 1." There then results for the output bit locations a highest positive value as the power at base "2" which is equal to the input bit locations at the first input 231 plus the number A of bit locations of the binary bit sequence of the multiplication value $k$, and a lowest value equal to $2^{-A}$. This results in the same number of bit locations at the output 233 as there are input bit locations at the first input 231 of the adder 23 plus twice the number A of bit locations of the multiplication value $k$.

A delay line memory 24 is disposed between the output 233 of the adder 23 and the output of the integrator and consists, for a binary integration, of shift registers. For parallel coding the delay line memory 24 has as many parallel shift registers as there are bit locations at the output 233 of the adder 23 or at the output of the integrator, respectively. Each shift register consists of as many memory cells as there are group characteristics formed, i.e. a plurality $m$ of series-connected memory cells of a shift register corresponds to the plurality $m$ of group characteristics. All parallel memory cells form a memory location so that the delay line memory 24 consists of $m$ series-connected memory locations which are operated at the clock pulse repetition rate $Pr$.

For serial coding of the group signals $9i$ the components of the circuit according to the present invention operate in binary series. The delay line memory 24 again consists of $m$ series-connected memory locations, each memory position now having as many memory cells, however, as there are input bit locations at the first input 231 of the adder 23 plus twice the number A of bit locations of the multiplication value $k$. The difference between the circuit design for serial or parallel coding corresponds to the technical differences discussed for the two types of circuits for use as the memory circuit.

Upon consideration of the principal dimensions of the binary adder 23 and the delay line memory 24, the interaction of the entire circuit arrangements must now be considered in order to explain which type of total circuit construction results in the integration behavior. The advantage of the basic circuit according to FIG. 16 for realizing the present invention can best be explained with the use of concrete numerical examples.

For example, the output signal $Mi$ from the multiplier 21 at the first input 231 of the adder 23 is a four-digit parallel coded binary signal. The multiplication value $k$ is assumed to be less than the decimal value "1" By the deviation $2^{-A} = 2^{-10}$. In the multiplicand generator 27 the multiplication value $k = (1-2^{-10})$ is set as the binary sequence of digits with the number $A = 10$ bit locations. Thus the delay line memory 24 consists of $(4 + 2A = 24)$ parallel shift registers which are controlled by the clock pulse repetition rate $Pr$ and whose respective number of memory cells is equal to the plurality $m$. The 24 parallel shift registers are connected with all bit locations at the output 233 of the adder 23 whose values range from $2^{14}$ to $2^{-10}$. All the shift registers are connected with their last memory cell, according to the values at the output 233 of the adder 23, with the corresponding bit locations at the input 261 of a multiplier 26 in a feedback branch 25. The bit locations at the output of the multiplier 26 are connected with the bit locations at the second input 232 of the adder 23 according to their values. The highest positive value at the output of the integrator is $2^4/(1-k) = 2^4/2^{-10} = 2^{14}$, the lowest value equals $2^{-10}$. Bit locations with the same value can be found at the first input 261 of the multiplier 26. The product from the multiplication value $k = (1-2^{-10})$ and a signal whose bit locations all have the switching state "log 1" and are present at input 261 of multiplier 26, determines the bit locations as well as their values at the second input 232 of adder 23.

Since the multiplication value $k = (1-2^{-10})$ is always less than the decimal value "1," in no case will more than fourteen bit locations be required at the second input 232 of adder 23.

Figure 17:
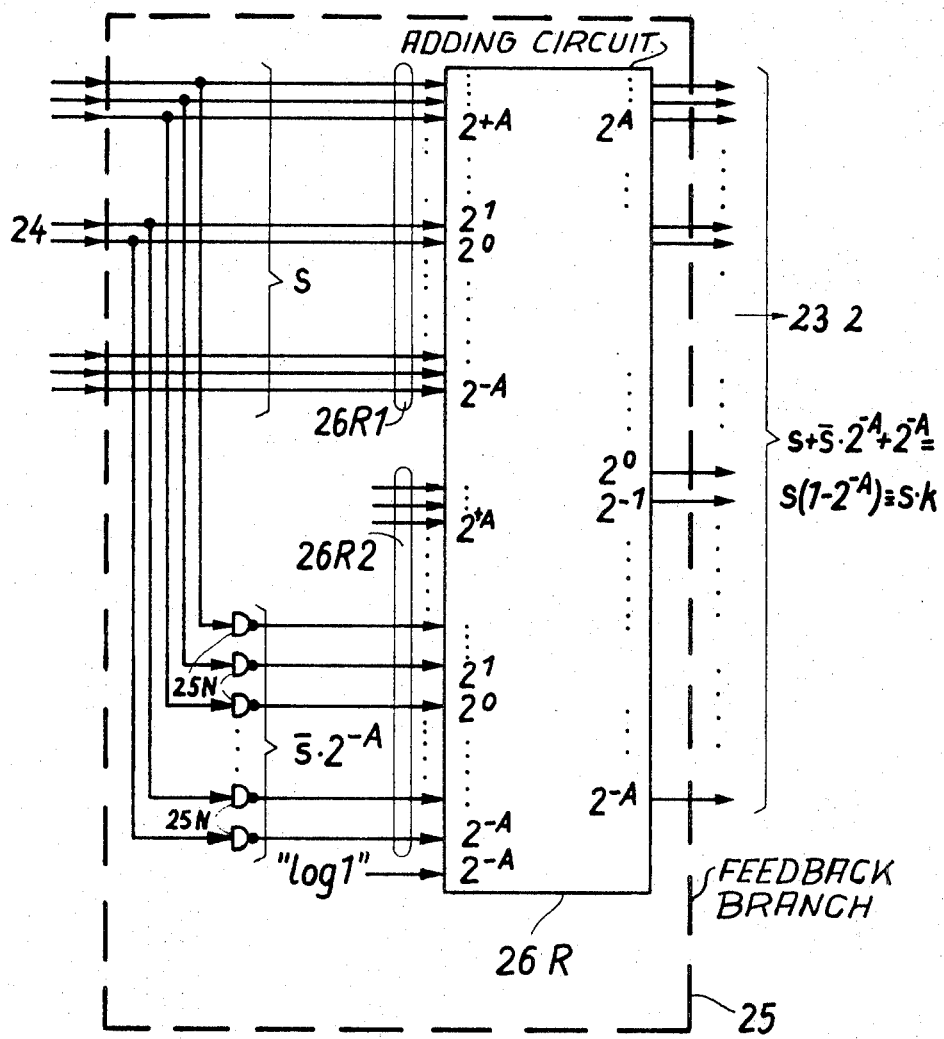
FIG. 17 is a block circuit diagram of an adding device particularly useful as a feedback branch in certain embodiments of the present invention.

The binary multiplier 26, as it is shown in FIG. 16, is a relatively expensive component; moreover, a binary multiplication requires more time than a binary addition. For both reasons the cooperation between the multiplicand generator 27 and the multiplier 26 is advantageously based, within the scope of the present invention, on a possible realization with the use of simple adders in the case where the multiplication value $k$ in a concrete case of application of the circuit according to the present invention has been fixed and has a numerical value of $k = 1 - 2^{-4}$. In that case the circuitry in the feedback branch 25 can be considerably reduced, compared to the embodiment according to FIG. 14, in that the feedback branch is constructed in a very simple manner by a specially controlled adding circuit as shown in FIG. 17. The multiplication with the multiplication value $k = (1 - 2^{-4})$ for this case is based on such an addition process in which a signal $s$ at the output of the delay line memory 24 is negated by bit location via inverter or negation stages 25N and is subsequently lowered in its value by the number A. These bit locations with lower values of the negated signal $\bar{s}$ are connected with bit locations of a second input 26R2 of an addition circuit 26R corresponding to their new values. Such an association of the value of the bit locations after signal negation is equivalent to the mathematical operation $s \cdot 2^{-4}$. In the addition circuit 26R the signal $s$ at the output of the delay line memory 24 is added to its negated signal $\bar{s}$ which has been multiplied by the deviation $2^{-4}$ by shifting its value. (A switching stage "log 1," for instance the positive pole of a power source, is also added to this result at the bit location with the lowest value, here $2^{-4}$, of the second input 26R2. If a carry results in this additional addition, it is considered in the bit locations of the next higher values affected within the addition circuit 26R. At the output of the addition circuit 26R, serving as the output of the feedback branch 25, a binary bit sequence can be obtained whose values are equal to the values at its inputs 26R1; 26R2. This binary bit sequence at the output of the addition circuit 26R is equal to the product $k \cdot s$, i.e. the multiplication value $k$ multiplied by the signal $s$ at the output of the delay line memory 24. This product formation has been effected by the simple addition circuit 26R without the need for a multiplier and multiplicand generator as required in the circuit according to FIG. 16 and is realised by so called half-adders and full-adders.

Figure 18:
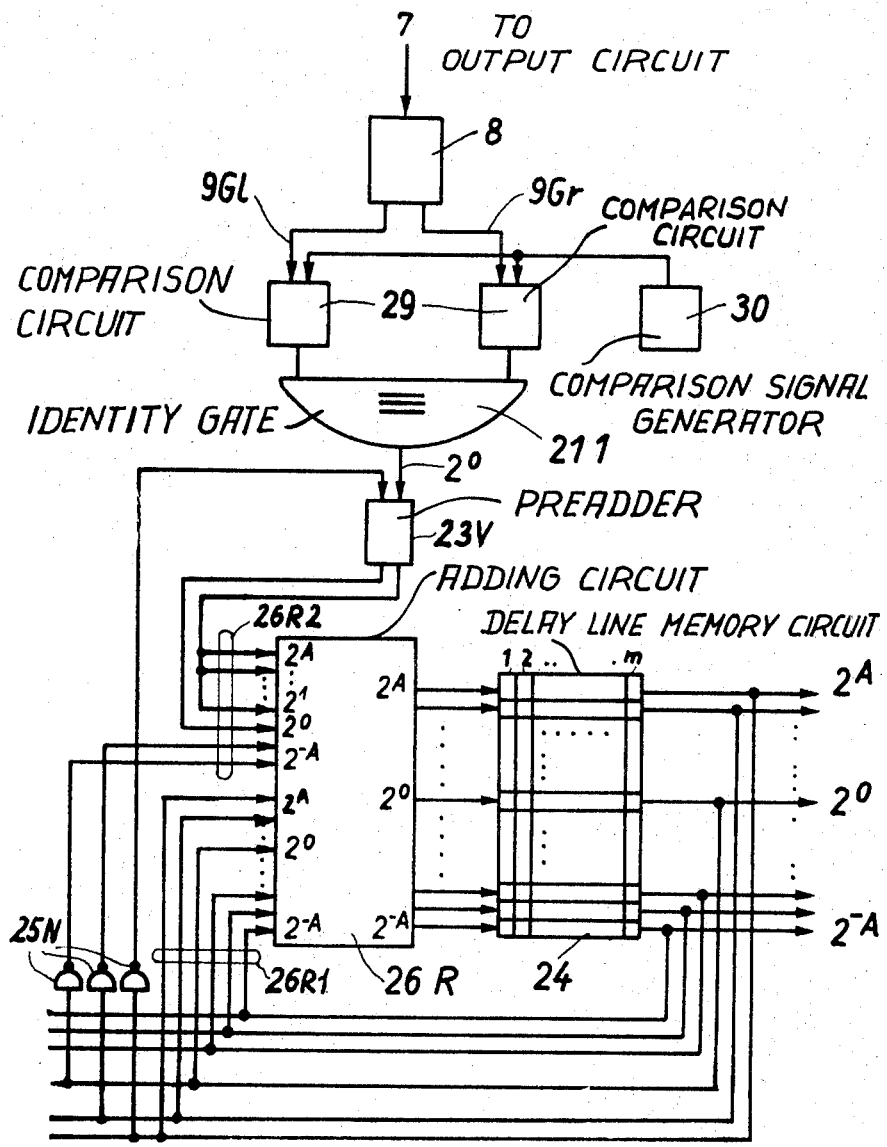
FIG. 18 is a block circuit diagram of the circuit arrangement according to a preferred embodiment of the present invention involving a polarity coincidence correlation.

FIG. 18 shows a further simplification of the circuit arrangement according to the present invention for the most frequent type of application, namely a polarity coincidence correlation. The multiplier connected to an adding circuit 8 can, in this case, be realized very simply by an identity gate 211. At the output of the identity gate 211 only two switching states are possible, i.e. "log 1" or "log 0," that is at the output of the identity gate 211 or at the input of the integrator, respectively, there remains only one bit location with the value "$2^0$." This reduces the required bit locations at the output of the integrator. They have the values $2^4$ to $2^{-4}$. The bit locations at the output of the integrator are directly connected with bit locations of the first input 26R1 of an addition circuit 26R, as they are in FIG. 17, and are shifted in their value by $2^{-4}$, via negation inverter stages 25N, and connected with the second input 26R2.

Only the bit location with the value $2^4$ is connected with one input of a preadder 23V via one of the negation stages 25N, the second input of the preadder being connected from the output of the identity gate 211. The preadder 23V has two outputs, one for the bit location with the value "$2^0$" and one for a carry with the value "$2^1$." The output for the bit location is connected with the bit location of the value "$2^0$" of the second input 26R2 of the addition circuit 26R and the output for the carry with the bit location of the value "$2^1$" and all bit locations with higher values. The group signals 9i which were prepared according to the polarity coincidence correlation appear at the output of integrator serially in time.

Figure 19:
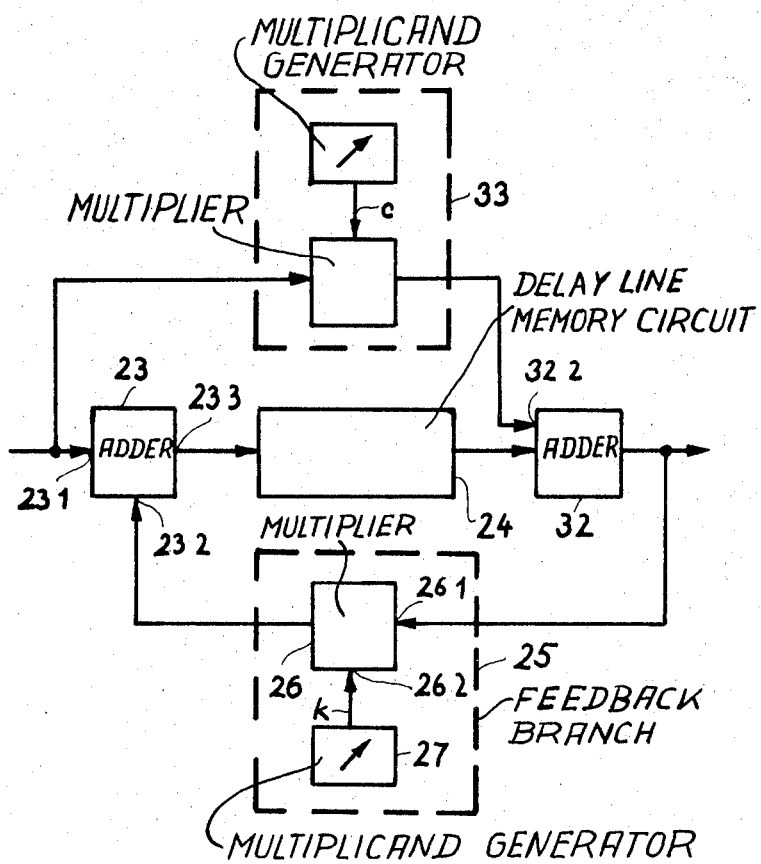
FIG. 19 is a block circuit diagram of a modified integrator particularly useful in certain embodiments of the present invention.

FIG. 19 is a block circuit diagram of a modified integrator. In this case the output of a delay line memory 24 is connected to the input of a feedback branch 25 via an addition stage 32. The second input of the addition stage 32 is supplied with an output signal Mi from the first input 231 of an adder 23 via a multiplication stage 33. In the multiplication stage 33 the output signal Mi is multiplied with a multiplicand $c$ which can be set in the multiplication stage 33 and whose value can be selectively given as a positive value, as a zero value or as a negative value. If the multiplicand is exactly zero, this block circuit diagram corresponds to the integrator 22 shown in FIG. 13. Depending on the given value of the multiplicand the integration behavior of the integrator is modified, the transmission function of the entire integrator then does not only have a pole, but also a zero point.

The circuit arrangement according to the present invention which is relatively inexpensive in circuitry, measured by its multiple applicability, thus results, in the most frequently employed type of processing of group signals in the ranging art, in a conceivably simply constructed realization which does not easily malfunction and which furthermore operates serially in time — as for the formation of group signals.

It will be understood that the above description of the present invention is susceptible to various modifications, changes and adaptations, and the same are intended to be comprehended within the meaning and range of equivalents of the appended claims.

I claim:

1. A circuit arrangement for forming a time sequence of group signals in the ranging art for a momentarily effective characteristic of a group of adjacent group characteristics obtained from received signals originating from a number $n$ of adjacently aligned transducers from a larger plurality of $m$ transducers in a signal receiving system, the group signals being formed by varied, quantized time delays determined by the geometrical arrangement of said plurality of $m$ transducers in the signal receiving system and by the propagation speed of impinging signals in the transmission medium, the circuit arrangement comprising, in combination:

generator means for producing clock pulses of a given repetition rate and clock pulses at a whole number multiple of said given rate, the given repetition rate being at least equal to twice the maximum frequency to be processed among the received signals multiplied by the plurality $m$ corresponding to said plurality of m transducers;

input circuit means coupled to said plurality of m transducers for the repeated, consecutive interrogation of each individual transducer W$i$, where $i$ equals 1, . . . ,m, of said plurality of m transducers, said input circuit means being a serial input circuit means and including (1) preprogrammed control circuit means coupled to said generator means and responsive to said clock pulses of said given repetition rate for developing control signals, (2) controllable scanning means having a single output and m inputs which are each respectively connected to a respective output of an individual transducer of said plurality of m transducers, said controllable scanning means being responsive to said control signals for switching said single input for short periods in succession to individual ones of said m inputs at said given repetition rate, and (3) serial analog-digital converter means coupled to said single output and responsive to signals therefrom for producing at its own sole output binary coded z-bit signals, said sole output constituting the output of said serial input circuit means and the binary coded z-bit signals appearing in series in step time $\tau$ which is equal to the reciprocal value of the given clock pulse repetition rate and equal to the time between two interrogations;

memory circuit means, having one read-in point coupled to the output of said input circuit means, with memory locations sequentially removed with respect to said read-in point and, with a volume of memory locations being at least determined by the maximum time delay for the first received signal, for storing each read-in interrogated received signal in succession so that it consecutively occupies in steps said memory locations which are further removed with respect to said read-in point, said memory circuit means being a binary serial memory means and including series-connected shift registers constituting k memory units, k being equal to 1, 2 . . . ,q, each memory unit having a number of series-connected memory cells equal to m times z and each having a clock pulse input coupled to said generator means and responsive to the clock pulses having the repetition rate which is a whole number multiple of the given repetition rate, the whole number being z and the multiple of the given pulse repetition rate being the storing rate, z series-connected memory cells constituting a memory location, the binary serial memory means having z times m times q memory cells and its number of memory locations being eqaul to m times q and the number q multiplied by the product z·m, with the given storing rate, being given by the maximum time delay;

the first shift register of said plurality of series-connected shift register having its input, which constitutes said read-in point, coupled to said sole output of said analog-digital converter means;

output circuit means coupled to said memory circuit means for the destruction-free read-out of stored interrogated signals which were received from a number n of adjacent transducers W2j, where 2j equals 1,2, . . . ,n, out of those memory locations of said volume of memory locations which correspond to required time delays with respect to said read-in point, said output circuit means being defined by a maximum of n connections between said adding circuit means and different ones of said memory locations of said binary serial memory means whose positions are determined with respect to said read-in point by a perpendicular line from each of said n transducers to a common reference line which lies perpendicular to the direction of the momentary group characteristic; and adding circuit means coupled to said output circuit means and responsive to signals therefrom, said adding circuit means including at least one binary serial adder having an output and whose inputs are connected to said maximum of n connections; and a serial digital-analog converter means coupled to the output of said binary serial adder for decoding signals therefrom;

whereby group signals appear in succession at the output of said digital-analog converter means.

2. An arrangement as defined in claim 1 wherein said number n of adjacently aligned transducers comprise a first number of 0.5n transducers and a second number of 0.5n transducers symmetrically arranged on respective sides of a line which represents the momentary direction of the group characteristic, the required time delays being tj, where j equals 1, . . . , 0.5n with respect to said read-in point.

3. An arrangement as defined in claim 1 wherein each of said plurality of m transducers is a sonic transducer, the receiving system being a sonar system.

4. An arrangement as defined in claim 1 wherein said plurality of m transducers are arranged in a symmetrical pattern.

5. An arrangement as defined in claim 4 wherein said transducers are arranged in a circle.

6. A circuit arrangement for forming a time sequence of group signals in the ranging art for a momentarily effective characteristic of a group of adjacent group characteristics obtained from received signals originating from a number n of adjacently aligned transducers from a larger plurality of m transducers in a signal receiving system, the group signals being formed by varied, quantized time delays determined by the geometrical arrangement of said plurality of m transducers in the signal receiving system and by the propagation speed of impinging signals in the transmission medium, the circuit arrangement comprising, in combination:

generator means for producing clock pulses of a given repetition rate;

input circuit means coupled to said plurality of m transducers for the repeated, consecutive interrogation of each individual transducer Wi, where i equals 1, . . . ,m, of said plurality of m transducers, said input circuit means comprising a parallel analog-digital converter means responsive to signals from said plurality of m transducers for producing at its own parallel outputs binary coded z-bit signals constituting the output from said input circuit means;

memory circuit means, having read-in point coupled to the output of said input circuit means, with memory locations sequentially removed with respect to said read-in point and, with a volume of memory locations being at least determined by the maximum time delay for the first received signal, for storing each read-in interrogated received signal in succession so that it consecutively occupies in steps said memory locations which are further removed with respect to said read-in point, said memory circuit means being a binary parallel memory means comprised of the same number z of identical chains each of $q$ series-connected shift registers, each register having $m$ memory cells and each having a clock pulse input coupled to said generator means and responsive to the clock pulses of said given pulse repetition rate, said binary parallel memory means having $z$ times $m$ times $q$ memory cells each memory unit being defined by $z$ parallel shift registers, each memory location being defined by $z$ parallel memory cells of a memory unit, and the number $q$ multiplied by $m$, with a given clock pulse repetition rate, being determined by the maximum desired time delay;

the beginning of each said chain, which constitutes said read-in point, being connected to a respective bit output from said parallel analog-digital converter means;

output circuit means coupled to said memory circuit means for the destruction-free read-out of stored interrogated signals which were received from a number n of adjacent transducers W$2j$, where $2j$ equals $1,2,\ldots,n$, out of those memory locations of said volume of memory locations which correspond to required time delays with respect to said read-in point, said output circuit means being defined by a maximum of n connections between said adding circuit means and different ones of said memory locations of said memory units of said parallel memory means whose positions are determined by a perpendicular line from each of said $n$ transducers to a common reference line which lies perpendicular to the direction of the momentary group characteristic;

adding circuit means coupled to said output circuit means and responsive to signals therefrom, said adding circuit means including at least one binary parallel adder having an output and whose inputs are connected to said maximum of n connections; and a parallel digital-analog converter means coupled to the outputs of said parallel adder for decoding signals therefrom;

whereby group signals appear in succession at the output of said digital-analog converter means.

7. In a circuit arrangement for forming a time sequence of group signals in the ranging art for a momentarily effective characteristic of a group of adjacent group characteristics obtained from received signals originating from a number $n$ of adjacently aligned transducers from a larger plurality of $m$ transducers in a signal receiving system, the group signals being formed by varied, quantized time delays determined by the geometrical arrangement of said plurality of $m$ transducers in the signal receiving system and by the propagation speed of impinging signals in the transmission medium, said circuit arrangement comprising:

input circuit means coupled to said plurality of m transducers for the repeated, consecutive interrogation of each individual transducer W$i$, where $i$ equals $1,\ldots,m$, of said plurality of $m$ transducers;

memory circuit means, having one read-in point coupled to the output of said input circuit means, with memory locations sequentially removed with respect to said read-in point and with a volume of memory locations being at least determined by the maximum time delay for the first received signal, for storing each read-in interrogated received signal in succession so that it consecutively occupies in steps said memory locations which are further removed with respect to said read-in point;

output circuit means coupled to said memory circuit means for the destruction-free read-out of stored interrogated signals which were received from a number $n$ of adjacent transducers W$2j$, where $2j$ equals $1,2,\ldots,n$, out of those memory locations of said volume of memory locations which correspond to required time delays with respect to said read-in point; and adding circuit means coupled to said output circuit means and responsive to signals therefrom, whereby group signals derived from the received signals appear in succession at the output from said adding circuit means; the improvement wherein:

said number n of adjacently aligned transducers comprise a first number of $0.5n$ transducers and a second number of $0.5n$ transducers symmetrically arranged on respective sides of a line which represents the momentary direction of the group characteristic, the required time delays being $tj$, where $j$ equals $1,\ldots,0.5n$ with respect to said read-in point;

said input circuit means, said memory circuit means and said output circuit means are operatively arranged for forming two partial signals of a group signal, each partial signal being formed respectively of time delayed signals received from said first number of $0.5n$ transducers and from said second number of $0.5n$ transducers;

said adding circuit means comprises two partial adders and a final adder, one partial adder being provided for each partial signal and the outputs from said two partial adders being coupled to the inputs of said final adder at whose output appear the group signals; and, said output circuit means comprises respective $0.5n$ connections between the inputs of each partial adder and outputs of said memory circuit means whose positions are determined by a perpendicular line from each of the $0.5n$ transducers to a common reference line.

8. An arrangement as defined in claim 7 further comprising a source of clock pulses of given pulse repetition rate, and wherein: said memory circuit means is constituted of a plurality of $q$ serially connected memory units, each memory unit including a respective last memory location defining its one output; each output from said memory units which is closest to the required time delay being coupled to said two partial adders for forming partial signals via shift registers containing different numbers of memory cell units, the longest shift register having $0.5n - 1$ memory cell units and being connected to one of the two ends of said memory circuit means while the adjacent ones of said shift registers coupled to respective adjacent outputs of said memory circuit means are each shorter by one memory cell unit, and no shift register being connected between one input to said two partial adders and the respective other one of the two ends of said memory circuit means; and, a delay circuit connected between the outputs of one of said partial adders and the respective inputs of said final adder, said delay circuit providing a delay time equal to one cycle period T, which equals $m$ divided by said given pulse repetition rate, minus one-half the group time, which equals $0.5n$ divided by said given pulse repetition rate, said one of said partial adders being that partial adder which is coupled to the last memory unit of said memory circuit means via the longest of said shift registers.

9. An arrangement as defined in claim 7 further comprising delay circuit means; wherein said memory circuit means is a binary parallel memory means constituted by $q$ memory units each including a single output from its last memory location; wherein said two partial adders include respectively first and second groups of partial step adders, each of said partial step adders having one of its inputs coupled to respective outputs from such of said memory units which are closest to the desired required time delays, the outputs of each of said partial step adders being coupled via respective delay members to the other input of respective next adjacent partial step adder, each said delay member having a delay which is equal to the step time $\tau$ between two interrogations; wherein the last partial step adder of said first group has its one input connected directly to said read-in point of said binary parallel memory means, its output constituting the first partial signal; wherein the last partial step adder of said second group has its one input connected directly to the output of the last memory unit of said binary parallel memory means, its output constituting the second partial signal, output from said last partial step adder of said second group of step adders being coupled directly to said final adder, output from said last partial step adder of said first group of step adders being coupled via said delay circuit means to said final adder; and further comprising digital-analog converter means coupled to the output from said final adder and responsive to signals therefrom for converting the added binary signals to analog signals which appear at its output and constitute the group signals.

10. A circuit arrangement for forming a time sequence of group signals in the ranging art for a momentarily effective characteristic of a group of adjacent group characteristics obtained from received signals originating from a number $n$ of adjacently aligned transducers from a larger plurality of $m$ transducers in a signal receiving system, the group signals being formed by varied, quantized time delays determined by the geometrical arrangement of said plurality of $m$ transducers in the signal receiving system and by the propagation speed of impinging signals in the transmission medium, the circuit arrangement comprising, in combination:

input circuit means coupled to said plurality of m transducers for the repeated, consecutive interrogation of each individual transducer W$i$, where $i$ equals 1, . . . ,$m$, of said plurality of $m$ transducers;

memory circuit means, having one read-in point coupled to the output of said input circuit means, with memory units sequentially removed with respect to said read-in point and with a volume of memory units being at least determined by the maximum time delay for the first received signal, for storing each read-in interrogated received signal in succession so that it consecutively occupies in steps said memory units which are further removed with respect to said read-in point, said memory circuit means including memory units and being operatively arranged to provide binary output signals therefrom;

output circuit means coupled to said memory circuit means for the destruction-free read-out of stored interrogated signals which were received from a number n of adjacent transducers W$2j$, where $2j$ equals 1,2, . . . ,$n$, out of those memory units of said volume of memory units which correspond to required time delays with respect to said read-in point;

said output circuit means including binary multiplying circuit means connected to the output of each said memory unit of said memory circuit means;

staggered value signal generating means, having its output coupled as the second input to said multiplying circuit means; and adding circuit means having its inputs connected to the outputs of said binary multiplying means of said output circuit means and responsive to signals therefrom, whereby group signals derived from the received signals appear in succession at the output from said adding circuit means.

11. A circuit arrangement for forming a time sequence of group signals in the ranging art for a momentarily effective characteristic of a group of adjacent group characteristics obtained from received signals originating from a number $n$ of adjacently aligned transducers from a larger plurality of $m$ transducers in a signal receiving system, the group signals being formed by varied, quantized time delays determined by the geometrical arrangement of said plurality of $m$ transducers in the signal receiving system and by the propagation speed of impinging signals in the transmission medium, the circuit arrangement comprising, in combination:

input circuit means coupled to said plurality of m transducers for the repeated, consecutive interrogation of each individual transducer W$i$, where $i$ equals 1, . . . ,$m$, of said plurality of $m$ transducers;

memory circuit means, having one read-in point coupled to the output of said input circuit means, with memory locations sequentially removed with respect to said read-in point and, with a volume of memory locations being at least determined by the maximum time delay for the first received signal, for storing each read-in interrogated received signal in succession so that it consecutively occupies in steps said memory locations which are further removed with respect to said read-in point;

output circuit means coupled to said memory circuit means for the destruction-free read-out of stored interrogated signals which were received from a number n of adjacent transducers W$2j$ where $2j$ equals 1,2, . . . ,$n$, out of those memory locations of said volume of memory locations which corresponds to required time delays with respect to said read-in point, said output circuit means including controllable selector switches each having plural inputs, each of which is connected to the output of a different one of said memory units of said memory circuit means, and one output, said output of each selector switch, at each step thereof, being connected to that one of its plural inputs which corresponds to the time delay required due to the geometric arrangement of said number n of transducers; and adding circuit means responsive to the output signals from said output circuit means, said output of each said selector switch being coupled to one of the inputs of said adding circuit means, whereby group signals derived from the received signals appear in succession at the output from said adding circuit means.

12. An arrangement as defined in claim 11, wherein said output circuit means includes multiplying circuit means connected between the output of each said memory unit of said memory circuit means via said controllable selector switches and inputs of said adding circuit means, and further comprising a staggered value signal generator means, and a switching control circuit means for providing switching signals to said controllable selector switches and a control signal to said staggered value signal generator means, said staggered value signal generator means having its output coupled as a second input to said multiplying circuit means.

13. In a circuit arrangement for forming a time sequence of group signals in the ranging art for a momentarily effective characteristic of a group of adjacent group characteristics obtained from received signals originating from a number $n$ of adjacently aligned transducers from a larger plurality of $m$ transducers in a signal receiving system, the group signals being formed by varied, quantized time delays determined by the geometrical arrangement of said plurality of m transducers in the signal receiving system and by the propagation speed of impinging signals in the transmission medium, said circuit arrangement comprising:

input circuit means coupled to said plurality of $m$ transducers for the repeated, consecutive interrogation of each individual transducer W$i$, where $i$ equals $1, \ldots, m$, of said plurality of $m$ transducers;

memory circuit means, having one read-in point coupled to the output of said input circuit means, with memory units sequentially removed with respect to said read-in point and with a volume of memory units being at least determined by the maximum time delay for the first received signal, for storing each read-in interrogated received signal in succession so that it consecutively occupies in steps said memory units which are further removed with respect to said read-in point;

output circuit means coupled to said memory circuit means for the destruction-free read-out of stored interrogated signals which were received from a number n of adjacent transducers W2$j$ where 2$j$ equals $1,2 \ldots, n$, out of those memory locations of said volume of memory locations which correspond to required time delays with respect to said read-in point; and adding circuit means coupled to said output circuit means and responsive to signals therefrom, whereby group signals derived from the received signals appear in succession at the output from said adding circuit means;

the improvement wherein a desired time delay $t + X\tau$, which lies between two adjacent quantized time delays, $t$ and $t + m\tau$, that is, between a shorter time delay $t$ between said read-in point and the input to a given memory unit of said memory circuit and a longer time delay $t + m\tau$ between said read-in point and the output of said given memory unit, is approximated by: a connection between the output of said given memory unit and a first input of a first multiplier having a second input which receives a value representative of the desired time delay $t$ plus $x\tau$ minus the shorter time delay $t$, with respect to the cycle period T, which equals $m$ times $\tau$, between the input and the output of said given memory unit; a connection between the input of said given memory unit and a first input of second multiplier having a second input which receives a value representative of the longer time delay $t + m\tau$ minus the desired time delay $t$ plus $x\tau$, with respect to the cycle period T between the input and the output of said given memory unit; and an adder connected to the outputs from said first multiplier and said second multiplier, the output of said adder being coupled to said adding circuit means.

14. In a circuit arrangement for forming a time sequence of group signals in the ranging art for a momentarily effective characteristic of a group of adjacent group characteristics obtained from received signals originating from a number $n$ of adjacently aligned transducers from a larger plurality of $m$ transducers in a signal receiving system, the group signals being formed by varied, quantized time delays determined by the geometrical arrangement of said plurality of $m$ transducers in the signal receiving system and by the propagation speed of impinging signals in the transmission medium, said circuit arrangement comprising:

input circuit means coupled to said plurality of m transducers for the repeated, consecutive interrogation of each individual transducer W$i$, where $i$ equals $1, \ldots, m$, of said plurality of $m$ transducers;

memory circuit means, having one-read-in point coupled to the output of said input circuit means, with memory locations sequentially removed with respect to said read-in point and, with a volume of memory locations being at least determined by the maximum time delay for the first received signal, for storing each read-in interrogated received signal in succession so that it consecutively occupies in steps said memory locations which are further removed with respect to said read-in point;

output circuit means coupled to said memory circuit means for the destruction-free read-out of stored interrogated signals which were received from a number n of adjacent transducers W2$j$ where 2$j$ equals $1,2, \ldots, n$, out of those memory locations of said volume of memory locations which correspond to required time delays with respect to said read-in point; and adding circuit means coupled to said output circuit means and responsive to signals therefrom, whereby group signals derived from the received signals appear in succession at the output from said adding circuit means;

the improvement wherein a number of said input circuit means are provided and an equal number of said memory circuit means are provided, each of said input circuit means having its output coupled respectively to the respective read-in point of each respective memory circuit means, said output circuit means is coupled to outputs from each of said number of memory circuit means and has its output coupled to said adding circuit means; and each said input circuit means is simultaneously operatively coupled to a different one of said plurality of $m$ transducers with the distance between the respectively coupled transducers being always the same during the repeated, consecutive interrogation of each said individual transducer $W_i$.

15. A circuit arrangement for forming a time sequence of group signals in the ranging art for a momentarily effective characteristic of a group of adjacent group characteristics obtained from received signals originating from a number $n$ of adjacently aligned transducers from a larger plurality of $m$ transducers in a signal receiving system, the group signals being formed by varied, quantized time delays determined by the geometrical arrangement of said plurality of $m$ transducers in the signal receiving system and by the propagation speed of impinging signals in the transmission medium, the circuit arrangement comprising, in combination:

input circuit means coupled to said plurality of $m$ transducers for the repeated, consecutive interrogation of each individual transducer $W_i$, where $i$ equals $1, \ldots, m$, of said plurality of $m$ transducers;

memory circuit means, having one read-in point coupled to the output of said input circuit means, with memory locations sequentially removed with respect to said read-in point, and with a volume of memory locations being at least determined by the maximum time delay for the first received signals, for storing each read-in interrogated received signal in succession so that it consecutively occupies in steps said memory locations which are further removed with respect to said read-in point;

output circuit means coupled to said memory circuit means for the destruction-free read-out of stored interrogated signals which were received from a number $n$ of adjacent transducers $W2j$, where $2j$ equals $1, 2, \ldots, n$, out of those memory locations of said volume of memory locations which correspond to required time delays with respect to said read-in point;

adding circuit means coupled to said output circuit means and responsive to signals therefrom, whereby group signals derived from the received signals appear in succession at the output from said adding circuit means; and, means, including clock pulse generator means, a single multiplier means and integrator means, for processing a time sequence of signals from said adding circuit means, both inputs of said single multiplier means being coupled to said adding circuit means and responsive to output signals therefrom; said integrator means including an adder having a first input coupled to the output of said single multiplier means, a delay line memory means coupled to the output of said adder and a feedback branch coupled between the output of said delay line memory means and a second input of said adder; said delay line memory means having a plurality of $m$ series-connected memory locations, a control input of said delay line memory means being coupled to an output from said clock pulse generator means for receiving clock pulses therefrom; said feedback branch including a multiplicand generator and a multiplier having its output coupled to a second input of said adder, its first input coupled to the output of said delay line memory means and its second input coupled to the output from said multiplicand generator, said multiplicand generator providing an adjustable or given signal having a multiplication value $k$ of less than the decimal value 1; whereby time-serially processed group signals appear at the output of said delay line memory means.

16. An arrangement as defined in claim 15 wherein said adding circuit means is a digital adding means for producing group signals in digital form, said adder is a binary adder, said multiplier is a digital multiplier, and said multiplicand generator is operatively arranged to be settable with a given number of bit locations to provide a signal having a multiplication value $k$ as a binary sequence of digits for values with negative powers at base "2," said memory locations in said delay line memory means being provided with as many memory cells as there are bit locations at the input of said integrator means plus twice the number of bit locations required for the multiplication value $k$.

17. An arrangement as defined in claim 16 further comprising negation stages; and wherein said multiplier and said multiplicand generator comprise a binary addition circuit having two inputs and an output, its two inputs and its output each having as many bit locations as said delay line memory means has memory cells for each memory location and a binary sequence of digits for so many values with a positive power at base "2" as there are bit locations at the input of said integrator means plus a number "A" of bit locations of the multiplication value $k$ and for so many values with a negative power at base "2" as the number "A;" equivalent bit locations at the output of said integrator means and at the first input of said binary addition circuit being connected together, and only those bit locations at the output of said integrator means which have a higher value than those of the binary bit sequence of the multiplication value $k$ are connected, via respective ones of said negation stages, with those bit locations of the second input of said binary addition circuit whose value is lower by the number "A" of bit locations, and input means defined by the input to the binary location of said binary addition circuit with the lowest value for receiving a binary switching state "log 1" signal, the output from said binary addition circuit being the output of said feedback branch.

18. An arrangement as defined in claim 15 further comprising a comparison signal generator for producing a settable constant amplitude comparison signal, signal comparison means and switch means; and wherein one input of said single multiplier means is directly connected to the output of said adding circuit means and its second input is selectively and alternatively connected, via said switch means, directly to the output of said adding circuit means and an output of said comparison means which has one input coupled to the output of said comparison signal generator and a second input coupled to the output of said adding circuit means.

19. An arrangement as defined in claim 15, wherein said adding circuit means is operatively arranged for supplying a first partial signal and a second partial signal, and further comprising a comparison signal generator for producing a settable constant amplitude comparison signal, a first signal comparison means, a second signal comparison means and switch means, and wherein the first partial signal output and the second partial signal output of said adding circuit means are selectively coupled, via said switch means, directly to respective inputs of said single multiplier means or one partial signal directly and the other to respective first inputs of said first signal comparison means or said second signal comparison means, or both partial signals to first or second signal comparison means, second inputs of both said signal comparison means being coupled to the output of said comparison signal generator; the output of both said signal comparison means are selectively coupled, via said switch means, to respective inputs of said single multiplier means.

20. An arrangement as defined in claim 18 wherein said signal comparison means is provided with a switching threshold characteristic which is set by the comparison signal and whose output signal has either the value "+ 1" or the value "0."

21. An arrangement as defined in claim 19 wherein both said signal comparison means are provided with a switching threshold characteristic which is set by the comparison signal and whose output signals have either the value "+1" or the value "−1."

22. An arrangement as defined in claim 18 wherein said signal comparison means is provided with a switching characteristic which is set by the comparison signal and whose output is either the value "+1" or the value "−1."

23. An arrangement as defined in claim 21 further comprising a negation stage; wherein said single multiplier means is an identity gate; and wherein said multiplier and said multiplicand generator comprise: an additional circuit and a preadder, said preadder having only two inputs with only one bit location each and two outputs, one of which furnishes a carry, one input of said preadder being connected to the output of said identity gate, the other input of said preadder being connected, via said negation stage, with the highest value bit location at the output of said integrator means; one output of said preadder being connected to the bit location of said multiplier having the value "2⁰" forming part of one input of said addition circuit, and said output of said preadder which furnishes a carry being connected with all other bit locations having a higher value of the said one input of said addition circuit.

24. An arrangement as defined in claim 15 further comprising a second adder having one input connected to the output of said delay line memory means, a second multiplier means and a second multiplicand generator; and wherein said feedback branch is connected to the output of said second adder and thus to the output of said delay line memory means via said second adder, the second input of said second adder being coupled to the output of said second multiplier means, one input of said second multiplier means being connected to the first input of said first-mentioned adder and the second input of said second multiplier being connected to the output of said second multiplicand generator, said second multiplicand generator providing an adjustable or given signal having a value c which can be selectively given a positive value, a zero value or a negative value.

* * * * *

UNITED STATES PATENT OFFICE
CERTIFICATE OF CORRECTION

Patent No. 3,810,082                         Dated May 7th, 1974

Inventor(s) Egidius Arens

It is certified that error appears in the above-identified patent and that said Letters Patent are hereby corrected as shown below:

In the heading of the patent, line 4, change "Fried Krupp Gesellschaft" to --Fried. Krupp Gesellschaft mit--. Column 1, line 50, change "Auslegescrift" to --Auslegeschrift--. Column 2, line 10, change "Ayslegeschrift" to --Auslegeschrift--. Column 10, line 63, change "apeparing" to --appearing--. Column 18, line 46, change "W(0.5n+0)" to --W(0.5n+1)--. Column 21, line 17, change "ointing" to --pointing--. Column 22, line 24, change "ELEKTRONIC" to --ELEKTRONIK--; line 26, after "7W2j" insert --, 2j--. Column 24, line 21, change "i(FIG.1) to --(FIG.1)--. Column 27, line 21, change "SE(-" to --SE--; line 22, change "q-1)" to --(q-1). Column 31, line 26, change "9Y,Y" to --9y,y--. Column 32, line 65, change "k " to --k --. Column 34, line 65, change "-7" to -- -1 --. Column 36, line 40, change "By" to --by--. Column 37, line 21. after "negated" insert --bit location--; line 32, change "(A" to --A--. Column 40, line 56, after "having" insert --one--. Column 43, line 11, change the period to a comma --,--.Column 46 line 6, before "second" insert --a--; line 31, change "one-read-in" to --one read-in--. Column 47, line 26, change "signals" to --signal--. Column 49, line 29, change "additional" to --addition--.

Signed and sealed this 3rd day of December 1974.

(SEAL)
Attest:

McCOY M. GIBSON JR.                C. MARSHALL DANN
Attesting Officer                  Commissioner of Patents